United States Patent
MolavianJazi et al.

(10) Patent No.: US 11,497,026 B2
(45) Date of Patent: Nov. 8, 2022

(54) CHANNEL RECEPTION OR TRANSMISSION IN A CORESET BASED ON AN RSRP THRESHOLD

(71) Applicant: Samsung Electronics Co., Ltd., Suwon-si (KR)

(72) Inventors: Ebrahim MolavianJazi, Santa Clara, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/948,264

(22) Filed: Sep. 10, 2020

(65) Prior Publication Data

US 2021/0076384 A1    Mar. 11, 2021

Related U.S. Application Data

(60) Provisional application No. 62/899,139, filed on Sep. 11, 2019, provisional application No. 62/969,768, filed on Feb. 4, 2020.

(51) Int. Cl.
*H04L 5/00* (2006.01)
*H04W 72/04* (2009.01)
(Continued)

(52) U.S. Cl.
CPC ...... *H04W 72/0493* (2013.01); *H04B 17/318* (2015.01); *H04L 5/0051* (2013.01);
(Continued)

(58) Field of Classification Search
CPC ..... H04L 5/001; H04L 5/0035; H04L 5/0048; H04L 5/0051; H04L 5/0055;
(Continued)

(56) References Cited

U.S. PATENT DOCUMENTS

2010/0035615 A1    2/2010   Kitazoe et al.
2018/0124748 A1    5/2018   Baldemair et al.
(Continued)

FOREIGN PATENT DOCUMENTS

WO    2018083244 A1    5/2018

OTHER PUBLICATIONS

International Search Report and Written Opinion of the International Searching Authority in connection with International Patent Application No. PCT/KR2020/012313 dated Dec. 8, 2020, 7 pages.
(Continued)

*Primary Examiner* — Hoon J Chung

(57) ABSTRACT

Base stations and user equipments (UEs) for random access and contention resolution. A method for operating a UE includes receiving configurations for a first control resource set (CORESET) that includes a first number of resource blocks (RBs) in a frequency domain and a first number of symbols in a time domain, a second CORESET that includes a second number of RBs in the frequency domain and a second number of symbols in the time domain, and a reference signal received power (RSRP) threshold. The method further includes determining a first RSRP value and receiving a first physical downlink control channel (PDCCH). The first PDCCH reception is in the first CORESET when the first RSRP value is larger than the RSRP threshold and the first PDCCH reception is in the second CORESET when the first RSRP value is smaller than the RSRP threshold.

19 Claims, 10 Drawing Sheets

(51) Int. Cl.
    *H04W 74/08*     (2009.01)
    *H04B 17/318*     (2015.01)

(52) U.S. Cl.
    CPC ....... *H04L 5/0092* (2013.01); *H04W 72/0446* (2013.01); *H04W 72/0453* (2013.01); *H04W 74/0833* (2013.01)

(58) Field of Classification Search
    CPC .... H04L 5/0092; H04B 17/318; H04W 74/08; H04W 74/0833; H04W 72/0446; H04W 72/0453; H04W 72/0493
    See application file for complete search history.

(56) References Cited

U.S. PATENT DOCUMENTS

| | | |
|---|---|---|
| 2018/0376511 A1 | 12/2018 | Tsai et al. |
| 2019/0103941 A1 | 4/2019 | Seo et al. |
| 2019/0245737 A1* | 8/2019 | Zhou ........................ H04B 7/06 |

OTHER PUBLICATIONS

"5G; NR; Physical channels and modulation (3GPPTS 38.211 version 15.6.0 Release 15)", ETSI TS 138 211 V15.6.0, Jul. 2019, 100 pages.

"5G; NR; Multiplexing and channel coding (3GPP TS 38.212 version 15.6.0 Release 15)", ETSI TS 138 212 V15.6.0, Jul. 2019, 106 pages.

"5G; NR; Physical layer procedures for control (3GPP TS 38.213 version 15.6.0 Release 15)", ETSI TS 138 213 V15.6.0, Jul. 2019, 110 pages.

"5G; NR; Physical layer procedures for data (3GPP TS 38.214 version 15.6.0 Release 15)", ETSI TS 138 214 V15.6.0, Jul. 2019, 108 pages.

"5G; NR; Medium Access Control (MAC) protocol specification (3GPP TS 38.321 version 15.6.0 Release 15)", ETSI TS 138 321 V15.6.0, Jul. 2019, 80 pages.

"5G; NR; Radio Resource Control (RRC); Protocol specification (3GPP TS 38.331 version 15.6.0 Release 15)", ETSI TS 138 331 V15.6.0, Jul. 2019, 516 pages.

European Extended Search Report dated Jun. 15, 2022 regarding Application No. 20864192.8, 11 pages.

Nokia et al., "Remaining details on RACH procedure", 3GPP TSG RAN WG1 Meeting AH1-18, R1-1800557, 9 pages.

HTC, "Configuration for control resource sets and search spaces", 3GPP TSG RAN WG1 NR Ad-Hoc#2, R1-1711272, 4 pages.

* cited by examiner

CHANNEL RECEPTION OR TRANSMISSION IN A CORESET BASED ON AN RSRP THRESHOLD

CROSS-REFERENCE TO RELATED APPLICATIONS AND CLAIM OF PRIORITY

The present application claims priority to U.S. Provisional Patent Application No. 62/899,139, filed on Sep. 11, 2019 and U.S. Provisional Patent Application No. 62/969,768, filed on Feb. 4, 2020. The content of the above-identified patent document is incorporated herein by reference.

TECHNICAL FIELD

The present disclosure relates generally to wireless communication systems and, more specifically, the present disclosure relates to random access response and contention resolution.

BACKGROUND

5th generation (5G) or new radio (NR) mobile communications, initial commercialization of which is expected around 2020, is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beam-forming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to random access response and contention resolution.

In one embodiment, a method for operating a user equipment (UE) is provided. The method includes receiving configurations for a first control resource set (CORESET) that includes a first number of resource blocks (RBs) in a frequency domain and a first number of symbols in a time domain, a second CORESET that includes a second number of RBs in the frequency domain and a second number of symbols in the time domain, and a reference signal received power (RSRP) threshold. The second number of symbols is larger than the first number of symbols. The method further includes determining a first RSRP value and receiving a first physical downlink control channel (PDCCH). The first PDCCH reception is in the first CORESET when the first RSRP value is larger than the RSRP threshold and the first PDCCH reception is in the second CORESET when the first RSRP value is smaller than the RSRP threshold.

In another embodiment, a UE is provided. The UE includes a transceiver configured to receive configurations for a first CORESET that includes a first number of RBs in a frequency domain and a first number of symbols in a time domain, a second CORESET that includes a second number of RB s in the frequency domain and a second number of symbols in the time domain, and a RSRP threshold. The second number of symbols is larger than the first number of symbols. The UE further includes a processor configured to determine a first RSRP value. The transceiver is further configured to receive a first PDCCH. The first PDCCH reception is in the first CORESET when the first RSRP value is larger than the RSRP threshold and the first PDCCH reception is in the second CORESET when the first RSRP value is smaller than the RSRP threshold.

In yet another embodiment, a base station is provided. The base station includes a processor and a transceiver operably connected to the processor. The transceiver is configured to transmit configurations for a first CORESET that includes a first number of RBs in a frequency domain and a first number of symbols in a time domain, a second CORESET that includes a second number of RB s in the frequency domain and a second number of symbols in the time domain, and a RSRP threshold. The second number of symbols is larger than the first number of symbols. The transceiver is further configured to transmit a first PDCCH. The first PDCCH transmission is in the first CORESET or in the second CORESETs. The first PDCCH transmission schedules a transmission of a PDSCH that includes a RAR message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 1:
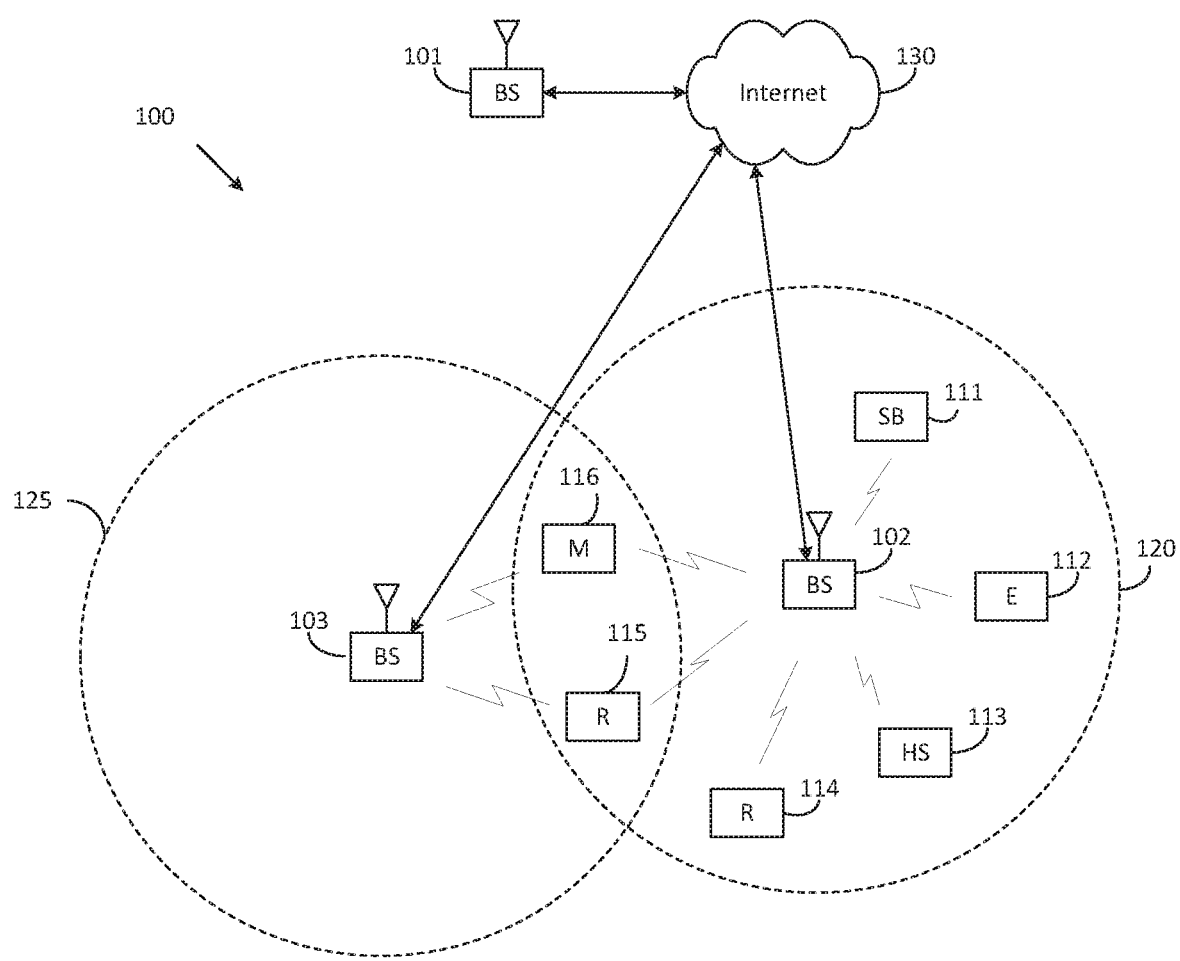
FIG. 1 illustrates an example wireless network according to embodiments of the present disclosure.
Figure 2:
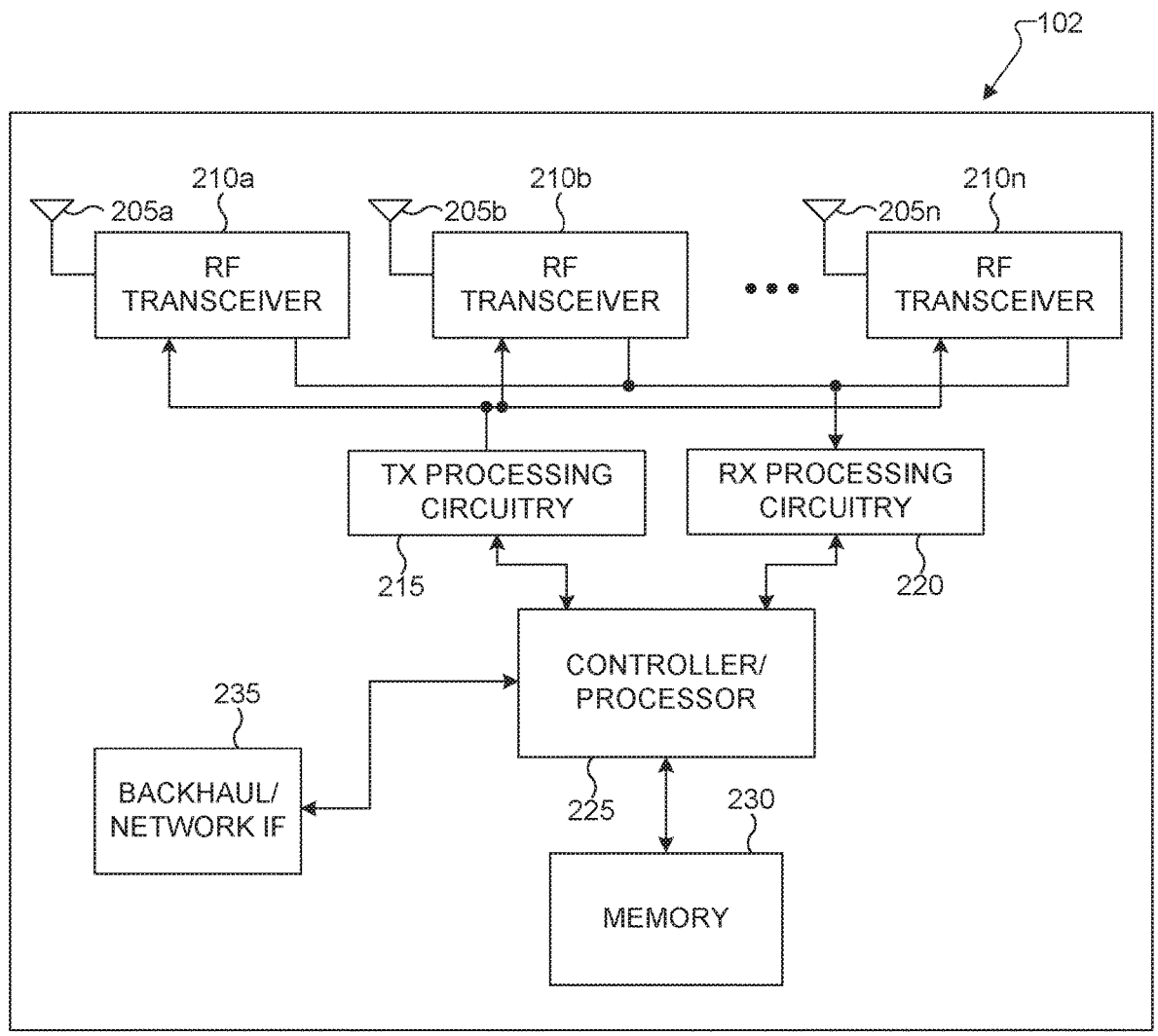
FIG. 2 illustrates an example gNB according to embodiments of the present disclosure.
Figure 3:
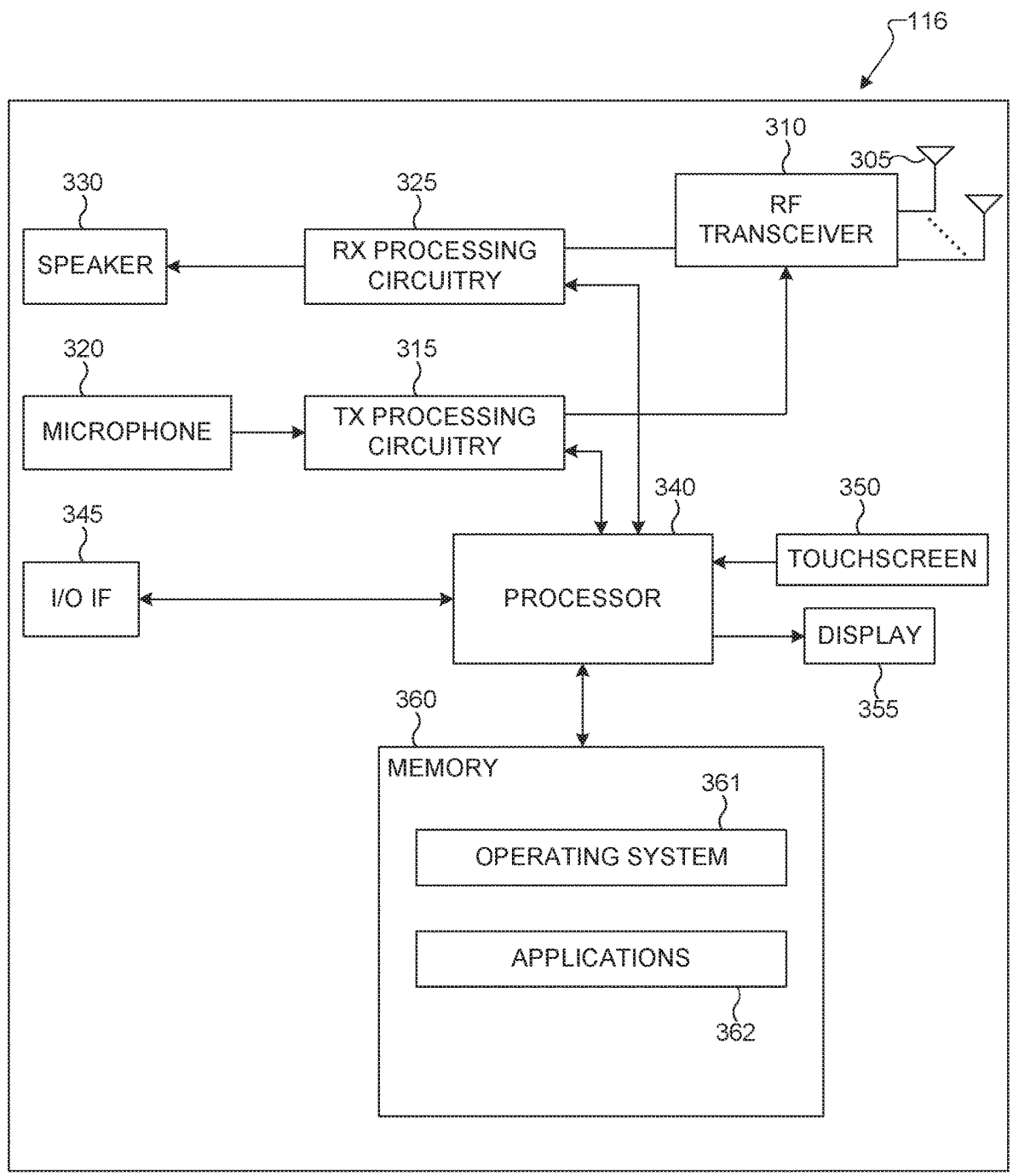
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient random access response and contention resolution for UEs. In certain embodiments, and one or more of the gNBs 101-103 includes circuitry, programing, or a combination thereof, for efficient random access response and contention resolution for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates or in lower frequency bands, such as 6 GHz, to allow for robust coverage. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
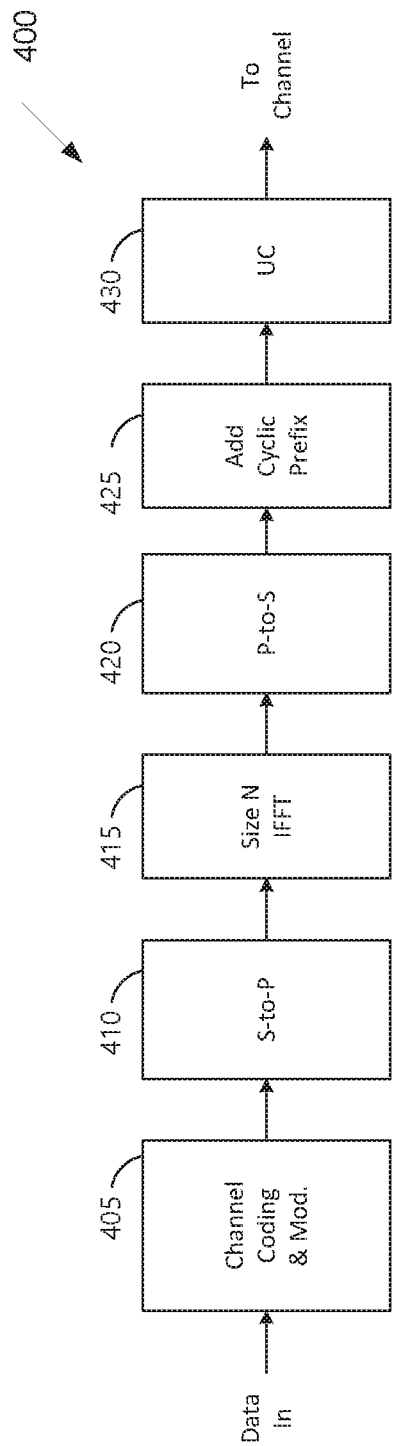
FIG. 4 illustrates an example DL slot structure according to embodiments of the present disclosure.
Figure 5:
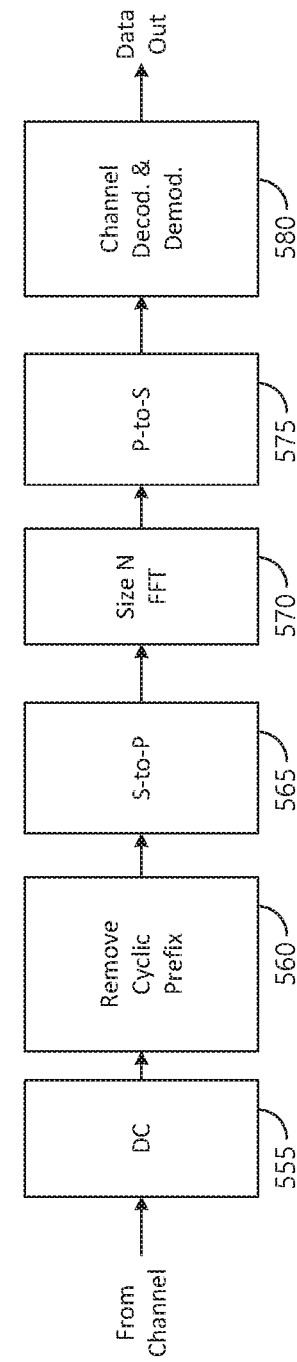
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A hybrid slot includes a DL transmission region, a guard period region, and an UL transmission region, similar to a special subframe in NR specification. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in NR specifications).

Many frequency bands are flexible duplex bands where receptions by a UE (or transmissions from a gNB) and transmissions from the UE (or receptions by a gNB) are based on time-division duplexing (TDD). For example, most bands for 5G/NR are TDD bands. TDD operation offers some important advantages, such as using a same band for DL and UL transmissions leading to simpler UE implementation, for example as a duplexer is not required, and being able to exploit channel reciprocity between DL and UL to provide accurate link adaptation. However, TDD operation also has some important disadvantages such increased latency because transmission/reception in a link direction (UL or DL) is not possible at all times, reduced data rates, and reduced coverage for a given latency compared to frequency-division duplexing (FDD).

To address some of the disadvantages for TDD operation, a dynamic adaptation of the link direction has been considered where, with the exception of some symbols in some slots supporting predetermined transmissions such as for SS/PBCH blocks, symbols of a slot can have a flexible direction (UL or DL) that a UE can determine according to scheduling information for receptions or transmissions. A control channel can also be used to provide a DCI format, such as DCI format 2_0 in NR specifications, that can indicate the link direction of some flexible symbols in one or more slots. Nevertheless, in actual deployments, it is difficult for a gNB scheduler to adapt the transmission direction of symbols without coordination with other gNB schedulers in the network. This is because of cross-link interference (CLI) where, for example, UL transmissions on a cell can experience large interference from DL transmissions on a neighboring cell from a gNB.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

A random access (RA) procedure is initiated by on the following methods: RRC (for SI-request)—if SIB 1 includes scheduling info for (on-demand) SI request; MAC; and PDCCH-order.

A random access procedure can be initiated due to at least one of the following triggers/purposes: (1) initial access to establish RRC connection (to go from RRC_IDLE to RRC_CONNECTED); (2) re-establish RRC connection after radio link failure (RLF); (3) on-demand system information (SI) request; (4) hand-over; (5) UL synchronization; (6) scheduling request (SR); (7) positioning; and (8) link recovery—also known as beam failure recovery (BFR).

Random access (RA) can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that are indicated by a serving gNB and may not be shared with other UEs so that RA collisions can be avoided. For example, CBRA may be used for all triggers/purposes mentioned above while CFRA may be used only for triggers/purposes (4) through (8) as shown above.

A 4-step random access procedure, also known as a Type-1 (L1) random access procedure, consists of the following steps/operations for a UE: transmission of a PRACH preamble (Msg1); attempting to receive a random access response (RAR or Msg2); transmitting a contention resolution message (Msg3); and attempting to receive a contention resolution message (msg4).

An alternative random access procedure can be also considered, which is so-called 2-step RACH or a Type-2 L1 random access procedure, where Msg1 and Msg3 are combined into a "MsgA" transmission and Msg2 and Msg4 above are combined into a "MsgB" reception.

Various embodiments of the present disclosure involve 4-step RACH, although the embodiments can generally apply to 2-step RACH as well and explicit individual descriptions are typically omitted for brevity.

A PRACH preamble transmission (for both CBRA and CFRA modes) is associated with a DL RS. This association can help a serving gNB to identify an uplink spatial reception filter/beam to receive a PRACH and can also help a UE to identify an uplink spatial transmission filter/beam to transmit a PRACH. For example, a UE can use a same or a related, such as with same quasi-colocation (QCL) properties and/or same direction but narrower width, uplink transmission filter/beam as that used for DL reception of an indicated DL RS for Msg1 transmission. This association can also be used to provide a DL RS resource for pathloss estimation for determining a PRACH preamble transmission power in NR specification.

A DL RS for Msg1 transmission can be one of the following options based on the PRACH scenario: SSB: for BFR, CFRA, PDCCH-order PRACH, SI request, CBRA; or CSI-RS: for BFR, CFRA, CBRA.

Throughout the present disclosure, an SSB is used as a short form for a SS/PBCH block. The terms SSB and SS/PBCH block are interchangeably used in this disclosure.

Furthermore, it is possible for a serving cell to be configured with both SSB and CSI-RS for PRACH transmissions. For example, some PRACH preambles can be associated with an SSB for QCL determination and some PRACH preambles can be associated with a CSI-RS for QCL determination. It is also possible that a secondary serving cell (SCell) does not have any SSB configuration/transmission and only supports PRACH transmissions from UEs using CSI-RS for QCL determination. Then, as described in the previous paragraph, certain random access triggers/modes such as for PDDCH-order PRACH or for SI request, are not applicable.

A RACH configuration includes RACH occasions (ROs) in certain RACH slots and certain frequency resource blocks, that repeat with a certain periodicity.

Once the UE has transmitted a PRACH preamble (Msg1), there are three more steps for (4-step) PRACH to be completed: UE attempting to receive a random access response (RAR or Msg2) from the gNB; UE transmitting a contention resolution message to the gNB (Msg3); and UE attempting to receive a contention resolution response message (Msg4) from the gNB.

Random access response (RAR or Msg2) is a PDCCH/PDSCH transmission that the UE receives on a DL BWP of a SpCell as described below: on the Initial DL BWP of the PCell/SpCell (for the case of initial access, i.e., (re-)establishing RRC connection)); or on the active DL BWP (with the same BWP-index as the active UL BWP) of an SpCell (for other random access triggers except for initial access). If the active DL BWP index (of the SpCell) is not equal to active UL BWP index (of the serving cell), then switch the active DL BWP to one with the same BWP index.

The SCS for PDCCH in RAR message is the SCS for Type1-PDCCH CSS set. The SCS for any future PDSCH is also the same SCS as that for PDSCH in RAR unless the UE is configured an SCS.

The PDCCH for RAR is a DCI format 1_0 that the UE monitors, during a certain configured time window, in Type1-PDCCH common search space (CSS) set of the SpCell identified by the RA-RNTI (or, for the case of BFR with CF-RA, in the search space indicated by recoverySearchSpaceId of the SpCell identified by the C-RNTI).

The PDSCH part of RAR contains the gNB response (note: the PDSCH can carry RAR messages for multiple UEs), which can be one the following three types.

In one example, a gNB sends a 4-bit backoff indicator (BI), which indicates the maximum back-off time needed before the next PRACH transmission attempt by the UE [The actual backoff time is selected by the UE uniformly at random between zero and the value indicated by the BI field]—such a response identifies an overload condition for the serving cell.

In another example, a gNB sends only a 6-bit random access preamble ID (RAPID), which indicates the ID for the preamble that is detected by the gNB—such a response is applicable only for acknowledgment of SI request.

In one example, a gNB sends a RAPID along with a MAC payload (a.k.a., MAC RAR), which includes a 12-bit timing advance (TA) command, a 27-bit uplink grant field for Msg3, and a 16-bit temporary C-RNTI (TC-RNTI).

Figure 6A:
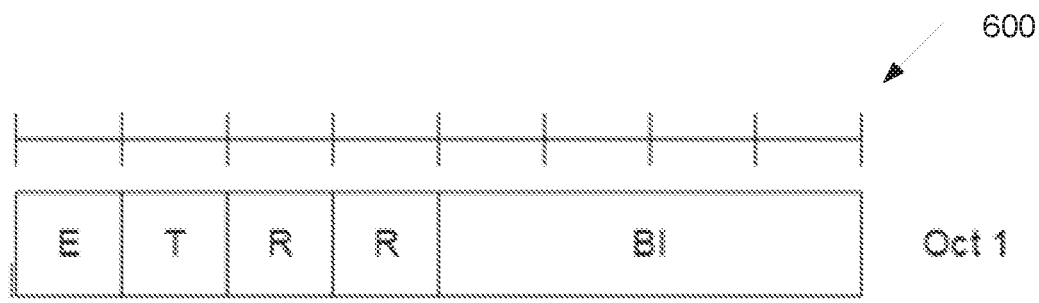
FIG. 6A illustrates an example E/R/R/BI MAC subheader according to embodiments of the present disclosure.

FIG. 6A illustrates an example E/R/R/BI MAC subheader 600 according to embodiments of the present disclosure. An embodiment of the E/R/R/BI MAC subheader 600 shown in FIG. 6A is for illustration only. One or more of the components illustrated in FIG. 6A can be implemented in specialized circuitry configured to perform the noted functions or one or more of the components can be implemented by one or more processors executing instructions to perform the noted functions. Other embodiments are used without departing from the scope of the present disclosure.

Figure 6B:
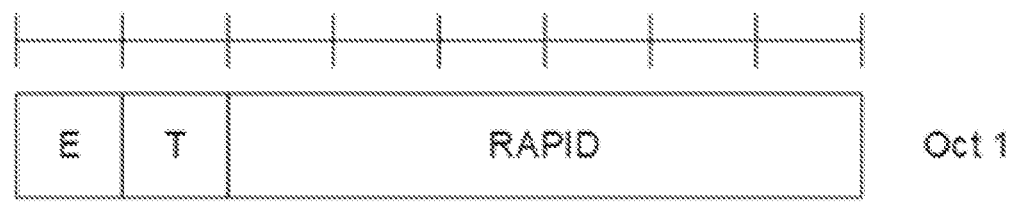
FIG. 6B illustrates an example E/T/RAPID MAC subheader according to embodiments of the present disclosure.

FIG. 6B illustrates an example E/T/RAPID MAC subheader 650 according to embodiments of the present disclosure. An embodiment of the E/T/RAPID MAC subheader 650 shown in FIG. 6B is for illustration only. One or more of the components illustrated in FIG. 6B can be implemented in specialized circuitry configured to perform the noted functions or one or more of the components can be implemented by one or more processors executing instructions to perform the noted functions. Other embodiments are used without departing from the scope of the present disclosure.

Figure 6C:
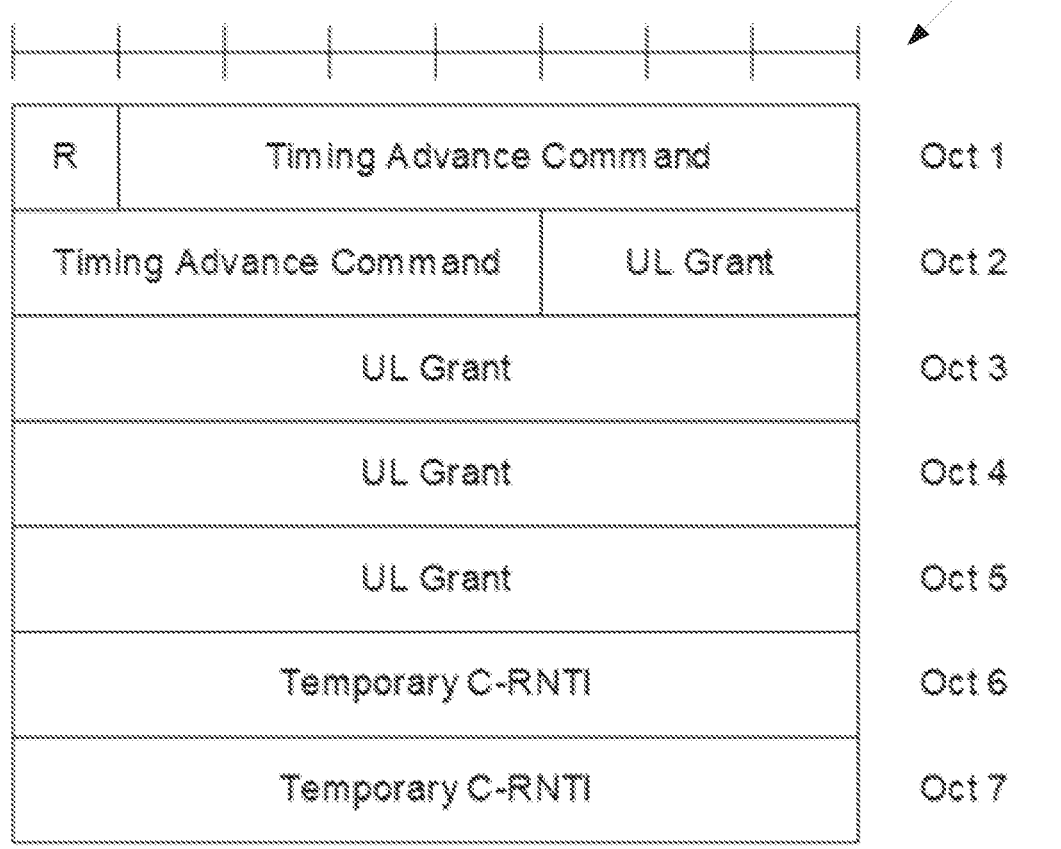
FIG. 6C illustrates an example MAC RAR according to embodiments of the present disclosure.

FIG. 6C illustrates an example MAC RAR 670 according to embodiments of the present disclosure. An embodiment of the MAC RAR 670 shown in FIG. 6C is for illustration only. One or more of the components illustrated in FIG. 6C can be implemented in specialized circuitry configured to perform the noted functions or one or more of the components can be implemented by one or more processors executing instructions to perform the noted functions. Other embodiments are used without departing from the scope of the present disclosure.

TABLE 1

Random access response grant content field size

| RAR grant field | NR | LTE | LTE MTC CEmodeA |
|---|---|---|---|
| Frequency hopping flag | 1 | 1 | |
| PUSCH frequency resource allocation | 14 | 10 | 4 |
| PUSCH time resource allocation | 4 | | |
| MCS | 4 | 4 | 3 |
| TPC command for PUSCH | 3 | 3 or 0 | 3 |
| CSI request | 1 | 1 | 1 |
| UL delay | | 1 | 1 |
| Number of Repetitions for Msg3 PUSCH | | 0 or 3 | 2 |
| Msg3 PUSCH narrowband index | | | $N_{NB}^{index}$ |
| Msg3/4 MPDCCH narrowband index | | | 2 |
| Zero padding | | | $4 - N_{NB}^{index}$ |
| Total number of bits | 27 | 20 | 20 |

TABLE 1 includes random access response grant content field size that include similar tables for LTE and NR specifications.

For the case of CFRA-based BFR, simply receiving a PDCCH during the time window and in the indicated search space of SpCell and addressed correctly to the C-RNTI is sufficient to consider RAR to be successful.

For other cases (such as CBRA and SI request), RAR is successful if (i) a PDCCH in the Type1-PDCCH common search space (CSS) set of the SpCell is received during the configured time window and is addressed to the RA-RNTI; and (ii) the corresponding PDSCH is correctly decoded [note that, HARQ is not supported for RAR]; and (iii) the MAC RAR contained in PDSCH part of RAR contains a random access preamble ID (RAPID); and (iv) the RAPID in MAC RAR matches the preamble selected and transmitted by the UE in Msg1. Then, the UE, for the serving cell where PRACH preamble/Msg1 was transmitted, applies the TA to adjust/correct the timing between a UE and a gNB, stores TC-RNTI for use in future transmission, and processes the RAR UL grant to transmit Msg3.

If RAR is not successful, the UE attempts (possibly after a back-off and/or UE processing time up to $N_{T,1}$+0.75 msec as specified in NR specification) a new PRACH preamble transmission with PRACH resource selection (possibly including a different SSB and/or a different preamble) and possibly applying PRACH preamble power ramping, unless the UE has already reached a configured maximum number of PRACH attempts, in which case a random access problem is reported to higher layers and the procedure stops.

The following is only about frequency domain resource allocation, since LTE only supports subframe-based PUSCH transmission, so no time domain resource allocation information is needed.

The (frequency) resource allocation for Msg3 (as identified in the RAR UL grant) in LTE includes: a 1-bit frequency hopping flag; and a 10-bit resource block assignment.

From the 10-bit resource assignment field, a b-bit field is generated as follows, where $$b = \left\lceil \log_2 \frac{N_{RB}^{UL}(N_{RB}^{UL} + 1)}{2} \right\rceil$$

where $N_{RB}^{UL}$ is the system bandwidth in terms of the number of RBs (in 15 kHz subcarrier spacing). Note, that b is the total number of consecutive resource allocations of any length in a system with bandwidth equal to $N_{RB}^{UL}$ PRBs.

If $N_{RB}^{UL} \leq 44$ (so that b<10), then truncate the 10-bit resource block assignment and use the least significant b bits in the following.

If $N_{RB}^{UL} > 44$ (so that b≥10), after the N_{UL, hop}=0, 1, 2 most significant bits of the 10-bit resource assignment field, add [b̃] zero-padding bits, where b̃=b−10, so that the entire field is b bits.

N_{UL, hop}=0 if the frequency hopping flag is 0 (i.e., disabled).

N_{UL, hop}=1 if the frequency hopping flag is 1, and the system bandwidth is 6≤$N_{RB}^{UL}$≤49 PRBs.

N_{UL, hop}=2 if the frequency hopping flag is 1, and the system bandwidth is 50≤$N_{RB}^{UL}$≤110 PRBs.

Finally, the obtained b-bit field is interpreted as in an LTE DCI format 0 as follows.

In one example, since the resource allocation type bit is not present in the RAR UL grant, only resource allocation type 0 is supported. In such example, uplink resource allocation type 0 indicates to a set of contiguously allocated virtual resource blocks from a starting resource block (RB$_{START}$) and with a length (L$_{CRBs}$≥1) in terms of contiguously allocated resource blocks. The indication is via a parameter "resource indication value" (RIV) that combines RB$_{START}$ and L$_{CRBs}$ to generate a value that can be described with fewer number of bits compared to the number of bits required for separate and individual indication of RB$_{START}$ and L$_{CRBs}$.

In another example, for PUSCH hopping (resource allocation type 0 only): $N_{UL\_hop}$ MSB bits are used to obtain the value of ñ$_{PRB}$(i) as indicated in LTE specification; and (b-$N_{UL\_hop}$) bits provide the resource allocation of the first slot in the UL subframe.

In yet another example, for non-hopping PUSCH with resource allocation type 0: b bits provide the resource allocation in the UL subframe as defined in LTE specification.

The following is only about frequency domain resource allocation, since LTE MTC only supports subframe-based PUSCH transmission, so no time domain resource allocation information is needed.

The resource allocation for Msg3 (as identified in the RAR UL grant) in LTE MTC CEmodeA includes: $0 \leq N_{NB}^{index} \leq 4$ bits for the Narrowband index for Msg3 PUSCH (assuming a maximum system bandwidth of 100 PRBs=20 MHz) along with (4-$N_{NH}^{index}$) zero-padding bits (to keep the size of RAR UL grant fixed), and 4 bits for resource allocation within the Narrowband, here, $N_{NB}^{index} = \lceil \log_2(N_{NB}) \rceil$ and $N_{NB} = \lfloor N_{RB}^{UL}/6 \rfloor$ and $N_{RB}^{UL}$ is the total UL system bandwidth.

The resource allocation field (for LTE MTC CEmodeA) is interpreted as follows: insert one most significant bit with value set to "0," and interpret the expanded resource allocation using UL resource allocation type 0 within the indicated narrowband. Note that, in general, 5 bits are required for indication of all possible consecutive resource allocations within a 6-PRB Narrowband (as is the case, for example, in DCI format 6-0A), however, using only four bits and by concatenating a "0" MSB, only consecutive resource allocations of length 1,2,3, and 6 PRBs within the Narrowband can be indicated (i.e., PUSCH Msg3 with length 4 or 5 PRBs cannot be indicated by RAR UL grant). Note: There is no 1-bit frequency hopping flag for PUSCH Msg3 in the RAR UL grant.

RAR UL grant also includes a 2-bit field for the number of Msg3 PUSCH repetitions, so that the repetition level ($N_{Msg3}$) for the initial transmission of Msg3 PUSCH is based on TABLE 2 (as shown in LTE specification), where $Y_A$ is determined by higher layer parameter pusch-maxNumRepetitionCEmodeA-r13 if the $Y_A$ is signaled, otherwise $Y_A$=8.

TABLE 2

Msg3 PUSCH Repetition Level Value for CEmodeA.

| Value of "Repetition number" | Msg3 PUSCH Repetition level |
|---|---|
| "00" | $Y_A/8$ |
| "01" | $Y_A/4$ |
| "10" | $Y_A/2$ |
| "11" | $Y_A$ |

The resource allocation for Msg3 (as identified in the RAR UL grant) in NR specification includes: a 1-bit frequency hopping flag; a 4-bit PUSCH time resource allocation; and a 14-bit PUSCH frequency resource allocation.

The 4-bit field for time resource allocation can be used per NR specification to identify the starting symbol and time-domain length of the Msg3 PUSCH transmission.

The 14-bit field for frequency domain resource allocation is by uplink resource allocation type 1 per NR specification which identifies allocations of consecutive (virtual) resource blocks, similar to LTE resource allocation Type 0 described above.

From the 14-bit resource assignment field, a b-bit field is generated as follows, where $$b = \left\lceil \log_2 \frac{N_{BWP}^{size}(N_{BWP}^{size}+1)}{2} \right\rceil$$

where $N_{BWP}^{size}$ is the bandwidth of the initial UL BWP in terms of the number of RBs (in subcarrier spacing of the initial UL BWP), regardless of whether or not the active UL BWP for the PUSCH Msg3 is initial UL BWP or another UL BWP with the same/different subcarrier spacing. Note, that b is the total number of consecutive resource allocations of any length in a BWP with size equal to $N_{BWP}^{size}$ PRBs.

If $N_{BWP}^{size} \leq 180$ (so that b<14), then truncate the 14-bit frequency resource allocation and use the least significant b bits in the following.

If $N_{BWP}^{size} > 180$ (so that b≥14), after the N_{UL, hop}=0, 1, 2 most significant bits of the 10-bit resource assignment field, add [b̄] zero-padding bits, where b̄=b−14, so that the entire field is b bits.

N_{UL, hop}=0 if the frequency hopping flag is 0 (i.e., disabled).

N_{UL, hop}=1 if the frequency hopping flag is 1, and the system bandwidth is $N_{RB}^{UL} \leq 49$ PRBs (also in line with 2 offset values configured in the higher layer parameter frequencyHoppingOffsetLists).

N_{UL, hop}=2 if the frequency hopping flag is 1, and the system bandwidth is $N_{RB}^{UL} \geq 50$ PRBs (also in line with 4 offset values configured in the higher layer parameter frequencyHoppingOffsetLists).

Finally, the obtained b-bit field is interpreted as in an NR DCI format 0_0 as follows.

In one example, for DCI format 0_0 (and therefore for PUSCH Msg3 in NR specification), only resource UL allocation type 1 is supported.

In such example, uplink resource allocation type 1 indicates to a set of contiguously allocated virtual resource blocks from a starting resource block ($RB_{START}$) and with a length ($L_{RBs}$) in terms of contiguously allocated resource blocks. The indication is via a parameter "resource indication value" (RIV) that combines $RB_{START}$ and $L_{RBs}$ to generate a value that can be described with fewer number of bits compared to the number of bits required for separate and individual indication of $RB_{START}$ and $L_{RBs}$.

In such example, note that, in DCI format 0_0, the size of bit field for frequency resource allocation Type 1 is aligned with the size of the UL BWP, however, RAR UL grant considers a fixed-size field with 14 bits.

In another example, for PUSCH hopping with resource allocation type 1: $N_{UL\_hop}$ MSB bits are used to obtain the hopping parameters as indicated in NR specification; and (b-$N_{UL\_hop}$) bits provide the resource allocation of the first slot in the UL subframe.

In yet another example, for non-hopping PUSCH with resource allocation type 1, b bits provide the resource allocation in the UL subframe as defined in NR specification.

In the present disclosure, the terms "4-step RACH" and "type-1 random access procedure" and "type-1 L1 random access procedure" are used interchangeably. Throughout the present disclosure, the terms "2-step RACH" and "type-2 random access procedure" and "type-2 L1 random access procedure" are used interchangeably.

Prior to initiation of the physical random-access procedure, layer 1 receives from higher layers an indication to perform a type-1 random access procedure (4-step RACH) or a type-2 random access procedure (2-step RACH).

From the physical layer perspective, the type-2 L1 random access procedure includes the transmission of random-access preamble in a PRACH and of a PUSCH (MsgA) and the reception of a RAR message with a PDCCH/PDSCH (MsgB). When random access response for a 2-step RACH indicates a fall-back to 4-step RACH (namely, a fallback-RAR), a 2-step RACH procedure continues similar to a 4-step RACH procedure, namely, the transmission of a PUSCH scheduled by a RAR UL grant, and PDSCH for contention resolution.

PRACH preambles for a 2-step RACH is separate from those for 4-step RACH, for example, the R contention based preambles per SS/PBCH block per valid PRACH occasion for type-2 random access procedure start after the ones for type-1 random access procedure.

RACH occasions (ROs) for a 2-step RACH can be common/shared with or can be separate from those for 4-step RACH.

In response to a transmission of a PRACH and a PUSCH, a UE attempts to detect a DCI format 1_0 with CRC scrambled by a corresponding RA-RNTI/MsgB-RNTI during a window controlled by higher layers as shown in NR specification.

The window starts at the first symbol of the earliest CORESET the UE is configured to receive PDCCH for Type1-PDCCH CSS set, as defined in NR specification, that is at least one symbol, after the last symbol of the PUSCH occasion corresponding to the PUSCH transmission (associated with 2-step RACH), where the symbol duration corresponds to the SCS for type1-PDCCH CSS set. The length of the window in number of slots, based on the SCS for type1-PDCCH CSS set, is provided by ra-Response Window (as used for 4-step RACH) or a separately configured time window length for 2-step RACH.

If the UE detects the DCI format 1_0, with CRC scrambled by the corresponding RA-RNTI/MsgB-RNTI, and a transport block in a corresponding PDSCH within the window, the UE passes the transport block to higher layers.

The higher layers indicate to the physical layer: an uplink grant if the RAR message(s) is for fallbackRAR and a random access preamble identity (RAPID) associated with the PRACH transmission is identified, and the UE procedure continues as in a 4-step RACH procedure when the UE detects a RAR UL grant; or a transmission of a PUCCH with HARQ-ACK information having ACK value if the RAR message(s) is for successRAR.

In such instance, a PUCCH resource for the transmission of the PUCCH is indicated by PUCCH resource indicator field of 4 bits in the successRAR from a PUCCH resource set that is provided by pucch-ResourceCommon; a slot for the PUCCH transmission is indicated by a PDSCH-to-HARQ feedback timing indicator field of 3 bits in the successRAR having a value k from {1, 2, 3, 4, 5, 6, 7, 8} and, with reference to slots for PUCCH transmission having duration $T_{slot}$, the slot is determined as ceil($(n+k+\Delta+t_\Delta)/T_{slot}$) where n is a slot of the PDSCH reception, $\Delta$ is for example as defined for PUSCH transmission (as shown in NR specification) or per a different table provided in the system specifications, and $t_\Delta \geq 0$; the UE does not expect the first symbol of the PUCCH transmission to be after the last symbol of the PDSCH reception by a time smaller than $N_{T,1}+0.5+t_\Delta$ msec where $N_{T,1}$ is the PDSCH processing time for UE processing capability 1 as defined in NR specification; and/or the PUCCH transmission is with a same spatial domain transmission filter and in a same active UL BWP as a last PUSCH transmission.

If the UE detects the DCI format 1_0 with CRC scrambled by a C-RNTI and a transport block in a corresponding PDSCH within the window, the UE transmits a PUCCH with HARQ-ACK information having ACK value if the UE correctly detects the transport block or NACK value if the UE incorrectly detects the transport block and the time alignment timer is running.

The UE does not expect to be indicated to transmit the PUCCH with the HARQ-ACK information at a time that is prior to a time when the UE applies a TA command that is provided by the transport block.

If the UE does not detect the DCI format 1_0 with CRC scrambled by the corresponding RA-RNTI/MsgB-RNTI within the window, or if the UE does not correctly receive the transport block in the corresponding PDSCH within the window, or if the higher layers do not identify the RAPID associated with the PRACH transmission from the UE, the higher layers can indicate to the physical layer to transmit only PRACH according to Type-1 random access procedure or to transmit both PRACH and PUSCH according to Type-2 random access procedure.

If requested by higher layers, the UE is expected to transmit a PRACH no later than $N_{T,1}+0.75$ msec after the last symbol of the window, or the last symbol of the PDSCH reception, where $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$ (as shown in NR specification).

Unless the UE is configured a SCS, the UE receives subsequent PDSCH using same SCS as for the PDSCH reception providing the RAR message.

For the case of contention-free random access (CF-RA) (as well as SI request), a correct reception of Msg2/RAR is the last step for the random access procedure. However, for the case of contention-based random access (CB-RA), it is likely that multiple UEs may have used the same preamble, and further steps are needed to resolve the contention. Furthermore, for the case of random access before RRC_CONNECTED state (i.e., for initial access), the UE and the gNB need to exchange further information to set up the connection.

Therefore, an uplink PUSCH transmission (Msg3) is needed for contention resolution request and possibly also for connection setup request, and a downlink transmission (Msg4) is needed for contention resolution response and possibly for connection setup response. The contention resolution (and connection set up, if applicable) is considered successful if the UE receives Msg4 within a certain time window after transmission of Msg3 and, for the case that the UE does not have a C-RNTI yet, also if the contention resolution ID in Msg4 matches the ID that the UE transmitted in Msg3.

Otherwise, the contention resolution Msg3/4 are and therefore the RACH attempt is considered unsuccessful and the UE needs to make another RACH attempt, unless the configured maximum number of RACH attempts have been already exhausted, in which case the entire random access procedure is declared as unsuccessful.

Upon failure of a RACH attempt (due to either no RAR reception, no match for RAP-ID in RAR with that in Msg1, or failure of contention resolution Msg3/4), the UE may redo the RACH resource selection, including selection of the DL RS for PRACH, selection of the PRACH preamble, and selection of RACH occasion. Therefore, it is possible that a different SSB/CSI-RS and/or a different PRACH preamble and/or a different RACH occasion is/are used for the next PRACH attempt compared to the previous PRACH attempt. However, power ramping is only applied if the same DL RS is used in the next PRACH attempt compared to the previous PRACH attempt.

In the following and throughout the present disclosure, the terms "NR-Light UE," "reduced capability UE" or "RedCap UE," and "BL/CE UE" are used interchangeably to refer to a UE or a group of UEs with reduced cost and/or complexity and/or capability, such as reduced bandwidth, reduced number of Rx and/or Tx RF chain, reduced power amplifier class (or simply, reduced power class), compared to a UE or UE group/category such as one as defined by NR specification. Additionally, while certain embodiments may refer to NR-Light UE or RedCap UEs with reduced capability, cost, and/or complexity compared to legacy UEs, any embodiments of the present disclosure may be also implemented in any type of UE including, for example, UEs with the same, similar, or more capabilities compared to legacy UEs.

Such a UE or UE group may be recognized as a UE category (or multiple UE categories) satisfying certain radio/service requirements, similar to 3GPP LTE UE Cat-M1. In addition, such a UE or UE group/category may support features for coverage enhancement.

Examples of such an NR-light UE may include wearables, smart watches, surveillance cameras, and other mid-tier wireless sensors used in industrial, residential, health or public safety, and so on. In certain scenarios and deployments, there may be hundreds or thousands NR-Light UEs within a serving cell in the RRC_CONNECTED state. Unless specifically mentioned otherwise, in the remaining of this disclosure the term "UE" is also used to refer to a NR-Light UE as an exemplary realization, or in general, to any UE that aims for/requires coverage recovery or coverage enhancement for PRACH and/or other UL/DL transmissions, e.g., any (category of) low-capability UEs such as feature phones and so on.

Although various embodiments of the present disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB 1, or by a common RRC signaling, or by UE-specific RRC signaling.

In the following, an association between a DL RS, such as a SS/PBCH block (SSB) or a CSI-RS, and a PRACH preamble is with respect to quasi-collocation (QCL) properties or a transmission configuration indicator (TCI) state (as shown in NR specifications)

A key element for improving a detection/miss probability at a serving gNB for a PRACH transmission from a UE is to increase a SINR for the PRACH reception at the gNB. One approach to increase the SINR is by repeating the PRACH transmission in multiple occasions to increase the probability of correct detection of the PRACH preamble by the gNB and/or to reduce the collision probability among a large number of UEs.

Accordingly, the operations/messages following PRACH preamble transmission such as random access response (RAR) and possibly Msg3/4 for contention resolution, if needed, can be repeated for increased reliability/robustness and improving coverage. An improved coverage results to faster (initial) access, connection setup, UL synchronization, and so on.

When considering random access procedure with repetitions, several issues need to be addressed including the following: timing aspects of random access Msg2/3/4 when repetition is configured for those messages; time/frequency resource allocation for Msg3 PUSCH as indicated in RAR UL grant; and congestion control for a large number of UEs via distribution of the UEs across the frequency spectrum.

The present disclosure addresses the above issues and provides additional design aspects for supporting a random access procedure where associated messages are transmitted with repetitions, and provides solutions as summarized in the next section and fully elaborated further below.

The present disclosure considers methods for repetition of RAR and Msg3/4, where the following concepts are introduced: repetition of random access response (RAR) and Msg3/4 based on RSRP range/CE level/UE power class; new DCI format/RNTI for RAR PDCCH, and new lengths of CORESET depending on RSRP range/CE level/UE power class; timing of RAR reception with repetitions, including—starting point for RAR PDCCH monitoring, and length of the monitoring window; timing of PRACH transmission after RAR failure when RAR is repeated; timing of Msg3 PUSCH transmission/Msg4 PDSCH reception when RAR and/or Msg3/4 is repeated; modification of RAR UL grant—new fields, such as number of repetitions for Msg3 PUSCH, UL BWP index for Msg3 PUSCH, DL BWP index for Msg3/4 PDCCH, modified fields, such as fewer/no bits for Msg3 frequency hopping, time/frequency allocation, MCS, or TPC command: use of UL BWP index for Msg3 PUSCH in RAR UL grant to distribute UEs in different parts of the spectrum and achieve congestion control; use of DL BWP index for Msg3/4 PDCCH in RAR UL grant to distribute UEs in different parts of the spectrum and achieve congestion control; use of UL resource allocation Type 2 (i.e., RBG-level indication) for Msg3 PUSCH; and/or avoiding smallest K2 values for Msg3 PUSCH; and/or distribution of UEs, such as NR-Light or low-capability UEs, across frequency spectrum during initial access using "cellBarred" and "intraFreqReselection" fields in the MIB.

In one embodiment, each of the PDCCH and PDSCH transmissions associated with scheduling and transmission of a random access response (RAR) can be with respective N repetitions where a value of N (same or different values for N for PDCCH and PDSCH) can be fixed in the specifications or be provided by higher layers (from a list of specified values for the number of repetitions). The motivation is to improve/recover/enhance DL coverage for a random access procedure by a UE. The embodiment can apply before and/or after a UE operates in RRC connected mode and/or is provided UE-specific configurations.

In one example, a number of repetitions for a PDSCH transmission providing a RAR can be the same for all RSRP ranges, CE levels and/or all UE power classes. In another example, the number can be different for different RSRP ranges, CE levels and/or different UE power classes. For example, a power amplifier class (or simply, a power class) for a UE such as a RedCap/NR-Light UE can be a reduced power amplifier class such as one of 10 dBm, 14 dBm, 17 dBm, 20 dBm, compared to a reference power amplifier class (or simply, a reference power class) such as 23 dBm.

In a related example, a number of repetitions for a PDSCH transmission providing a RAR for all different CE levels and/or different UE power classes are provided by higher layers, such as a value $N_0$ for RSRP range 0/CE level 0, a value $N_1$ for RSRSP range/CE level 1 and so on.

In another example, a number of repetitions for a PDSCH transmission providing a RAR is configured only for a reference RSRP range/CE level and/or UE power classes, and a number for another RSRP range/CE level and/or UE power class is determined based on a certain pre-defined rule such as $N_1$ for RSRP range/CE level 1 is two times larger than $N_0$ for RSRP range/CE level 0).

In one example, a number of repetitions for a PDSCH transmission providing a RAR can be different from the number of repetitions for PDCCH scheduling the PDSCH transmission and each number can be separately provided by higher layers per RSRP range/UE power class or one number, such as the number of repetitions for PDSCH transmission, can be derived from the other number, such as the number of repetitions for the PDDCH transmission, that is provided by higher layers.

Figure 7:
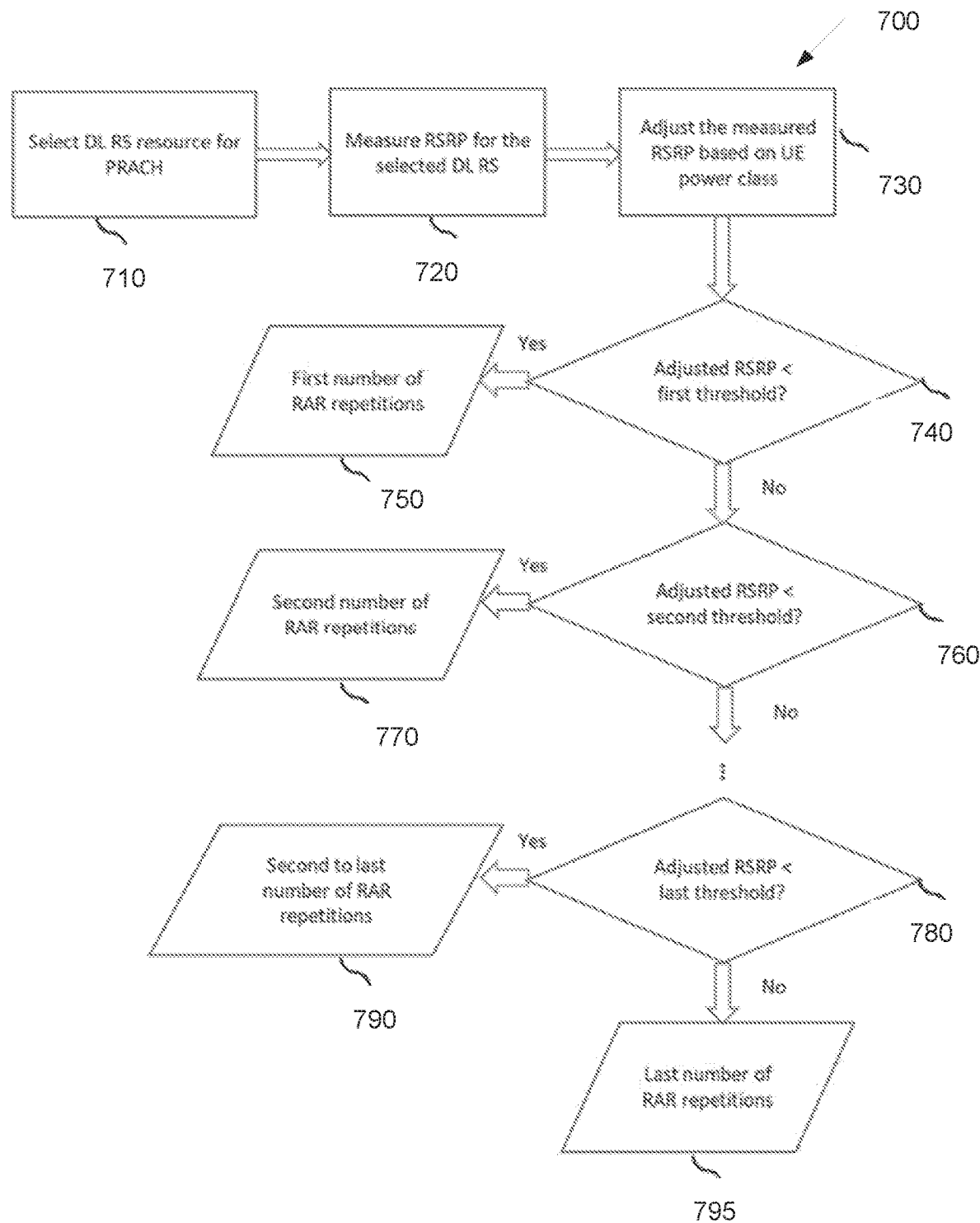
FIG. 7 illustrates an example determination for a number of repetitions for a PDSCH transmission providing a RAR based on RSRP range/CE level and UE power class according to embodiments of the present disclosure.

FIG. 7 illustrates an example determination for a number of repetitions 700 for a PDSCH transmission providing a RAR based on RSRP range/CE level and UE power class according to embodiments of the present disclosure. An embodiment of the determination for a number of repetitions 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A UE selects a DL RS resource for association with a PRACH transmission in step 710, such as an SSB or a CSI-RS. The UE then measures an RSRP for the selected DL RS resource in step 720 and adjusts the measured RSRP value based on the UE power class in step 730, for example, based on a difference of the UE amplifier power class (or simply, a UE power class) such as 10, 14, 17, 20 dBm with a reference UE power amplifier class (or simply, a reference UE power class) such as 23 dBm. The UE compares the adjusted RSRP with a first threshold in step 740 provided by higher layers.

When the adjusted RSRP is smaller than the first threshold, the UE determines a first number of repetitions in step 750 for a PDSCH reception providing a RAR. When the adjusted RSRP is not smaller than the first threshold, the UE compares the adjusted RSRP with a second threshold in step 760 provided by higher layers. When the adjusted RSRP is smaller than the second threshold, the UE determines a second number of repetitions in step 770 for a PDSCH reception providing a RAR; otherwise, the UE continues a same procedure until the UE compares the adjusted RSRP with a last threshold in step 780 provided by higher layers.

When the adjusted RSRP is smaller than the last threshold, the UE determines a second to last number of repetitions in step 790 for a PDSCH reception providing a RAR. When the adjusted RSRP is not smaller than the last threshold, the UE determines a last number of repetitions in step 795 for a PDSCH reception providing a RAR.

In one embodiment, the UE may receive a RAR with a first number of repetitions when a determined RSRP value is larger than a RSRP threshold and with a second number of repetitions when determined RSRP value is smaller than the RSRP threshold, Here, the first number of repetitions is smaller than the second number of repetitions.

In one embodiment, a UE may receive a RAR via a PDCCH/PDSCH transmission, where the PDCCH provides a DCI format that is different from DCI format 1_0 used in NR specification and can be similar to a DCI format 1_2 introduced in NR specification.

In one example, a CRC for the DCI format can be scrambled with a new RNTI, such as an L-RNTI or RC-RNTI, that is different from a RA-RNTI.

In one embodiment, a number of symbols for a CORESET where a UE monitors PDCCH for scheduling of a PDSCH reception providing a RAR depends on the RSRP range/CE level and/or the number of PRACH preamble repetitions and/or the number of repetitions for a PDSCH transmission providing a RAR.

In one example, a UE can monitor PDCCH in a search space set(s) associated with a CORESET with a number of symbols determined for a corresponding CE level or UE power class. For example, a UE can monitor PDCCH in a search space set(s) associated with a CORESET with length from {1, 2, 3} symbols, as indicated by higher layers, when the UE operates at a smaller CE level, such as CE level 0, and larger RSRP range, and can monitor PDCCH in a search space set(s) associated with a CORESET with length from {1, 2, 3, 6} symbols when the UE operates at a larger CE level, such as CE level 1, and a lower RSRP range.

In one example, a search space set(s) associated with a CORESET for monitoring a PDCCH, including a PDCCH that schedules a PDSCH transmission providing a RAR, can be based on a single/same reference, baseline CORESET #0 configured with a fixed maximal symbol length, such as 6 symbols, as specified in system operation or as provided by higher layers, wherein a UE in each CE level or UE power class monitors for a PDCCH in a search space set(s) associated with the reference, baseline CORESET #0 only within a number of symbols associated with the CE level or UE power class as per a mapping specified in system operation or provided by higher layers, for example, a UE in a smaller CE level monitors the reference, baseline CORESET #0 only in 2 symbols out of 6 symbols. All associated configurations in these examples can be provided by higher layers, such as SIB 1 and/or RRC.

In one example, a UE can be provided multiple search space sets to monitor PDCCH for.

In one example, the aforementioned examples and/or embodiments can apply to any PDCCH regardless corresponding to a PDSCH that provides a RAR or not.

In the aforementioned examples and/or embodiment, a symbol duration corresponds to an SCS for type1-PDCCH CSS set as defined in NR specification.

Figure 8:
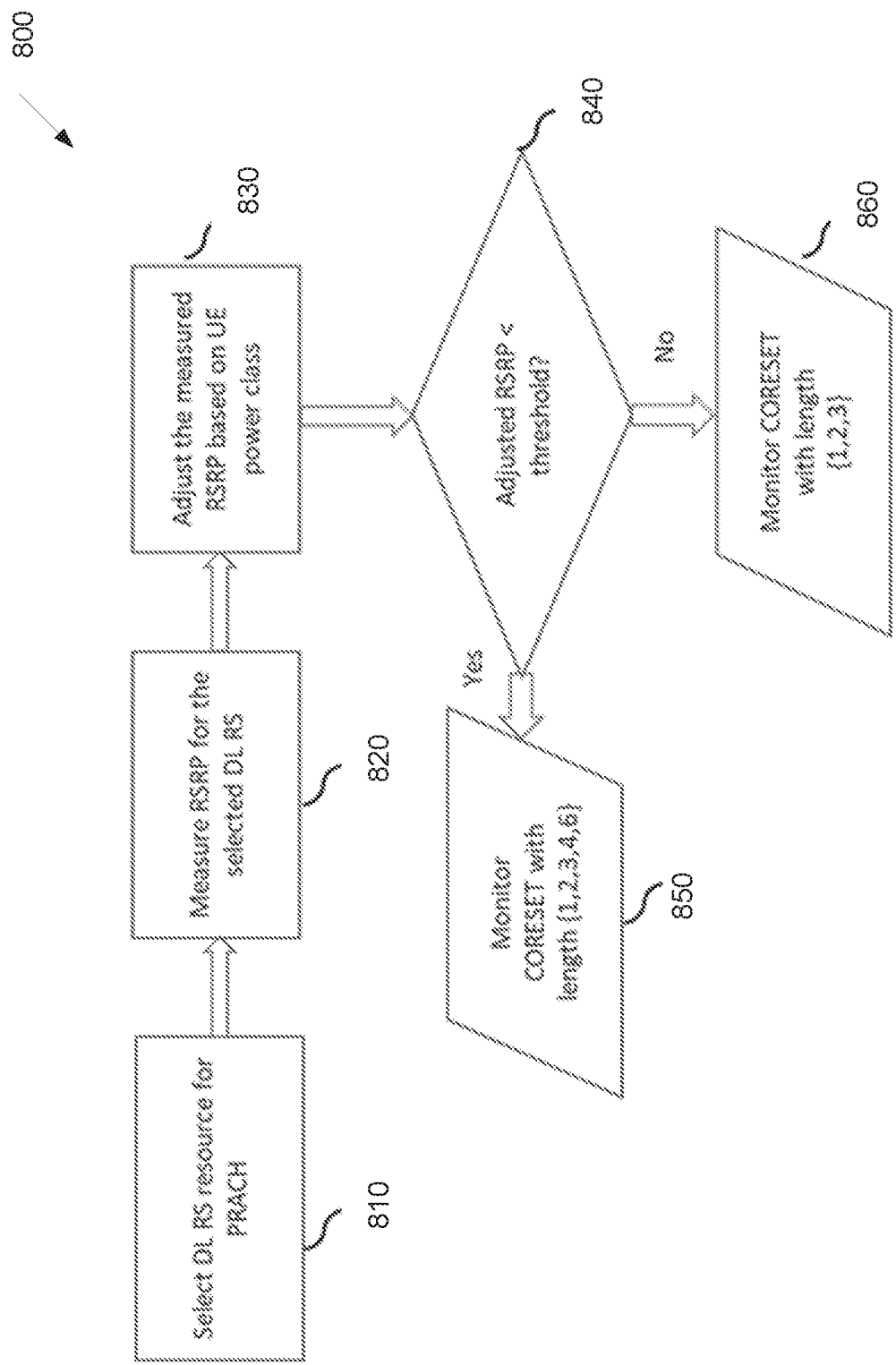
FIG. 8 illustrates an example determination by a UE of a CORESET length for PDCCH monitoring associated with scheduling of a PDSCH reception providing a RAR based on RSRP range/CE level and UE power class according to embodiments of the present disclosure.

FIG. 8 illustrates an example determination by a UE of a CORESET length 800 for PDCCH monitoring associated with scheduling of a PDSCH reception providing a RAR based on RSRP range/CE level and UE power class according to embodiments of the present disclosure. An embodiment of the determination by a UE of a CORESET length 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

The UE selects a DL RS resource for association with a PRACH transmission in step 810, such as an SSB or a CSI-RS, and measures a RSRP for the selected DL RS resource in step 820. Next, the UE adjusts the measured RSRP value based on the UE power class in step 830, such as based on a difference of the UE power amplifier class with a reference UE power amplifier class. The UE compares the adjusted RSRP with a threshold in step 850 that can be indicated by higher layers. When the adjusted RSRP is smaller than the threshold, the UE determines to monitor PDCCH in a CORESET with length from {1, 2, 3, 6} symbols for scheduling of a PDSCH reception providing a RAR in step 850. When the adjusted RSRP is not smaller than the threshold, the UE determines to monitor PDCCH in a CORESET with length from {1, 2, 3} symbols for scheduling a PDSCH reception providing a RAR in step 860.

In one embodiment, a start of the window for monitoring PDCCH for scheduling a PDSCH providing a RAR that corresponds to a PRACH preamble transmission with more than one repetition can be determined according to one of the following options.

In one example of option (A), the window starts after a last PRACH preamble repetition and at a first symbol of an earliest CORESET where the UE is configured to monitor PDCCH for Type1-PDCCH CSS set that is at least one symbol after a last symbol of the PRACH occasion corresponding to the last repetition of the PRACH transmission.

In another example of option (B), the window starts after a transmission of a first PRACH preamble repetition and at a first symbol of an earliest CORESET where the UE is configured to monitor PDCCH for Type1-PDCCH CSS set that is at least one symbol after a last symbol of the PRACH occasion corresponding to the first repetition of the PRACH transmission.

In yet another example of option (C), the window starts after a transmission of a repetition number, provided by higher layers, from a total number of PRACH preamble repetitions. For example, the window starts after half of the total number of repetitions are completed. The window starts at a first symbol of an earliest CORESET where the UE is configured to monitor PDCCH for Type1-PDCCH CSS set that is at least one symbol after a last symbol of the PRACH occasion corresponding to Nth repetition of the PRACH transmission, where N is either fixed in the specifications or is provided by higher layers. The value N can be same for all CE levels and/or UE power classes and/or UE bandwidth values/complexity level/capability or can be different for different CE levels and/or different UE power classes and/or different UE bandwidth values. In the latter case, higher layers can separately provide the value N for each CE level and/or UE power class and/or bandwidth value/complexity level/capability, or higher layers can provide the value N only for a reference setting and the UE can determine the value N for other settings based on the reference value and a pre-determined rule. For example, a value of N for RSRP range/CE level 1 is two times a value of N for RSRP range/CE level 0.

In the examples, a symbol duration corresponds to a SCS for type1-PDCCH CSS set as defined in NR specification.

A motivation for options (B) and (C) as illustrated above is that the gNB may detect a PRACH preamble before all PRACH preamble/Msg1 repetitions are completed. Then, the gNB can transmit a PDSCH with a RAR earlier.

In one example, the UE can transmit a PRACH preamble and monitor PDCCH for scheduling of a PDSCH reception providing a RAR on different serving cells.

In another example, a timing relationship/PDCCH monitoring gap can be defined between each repetition of PRACH preamble transmission and a PDCCH monitoring occasion for scheduling a PDSCH providing a RAR.

In yet another example, a PRACH preamble transmission and a PDCCH monitoring occasion can be overlapping. In a further example, different options can be used for different UE capabilities and/or operating bands. For example, option (A) can apply for a half-duplex UE while options (A) or (B) or (C) can apply for a full-duplex UE or for a UE operating in a TDD frequency band or in a FDD frequency band with a reference TDD UL/DL configuration.

In one example, for options (B) or (C), when the UE detects a DCI format scheduling a PDSCH reception providing a RAR, the UE can indicate to the gNB to stop transmitting remaining repetitions of PDCCH/PDSCH for providing the RAR.

In another example, the indication can be implicit, for example, by transmitting a HARQ ACK in a PUCCH, so that when the gNB receives the PUCCH with HARQ-ACK in response to a repetition of repetitions of PDCCH/PDSCH that provides the RAR, the gNB stops transmitting remaining repetitions of PDCCH/PDSCH for providing the RAR.

In one embodiment, for a UE configured with repetitions for a PRACH transmission, a window size, in terms of the number of slots, for monitoring PDCCH for scheduling of a PDSCH reception with a RAR, as configured by the higher layer parameter ra-Response Window, depends on a RSRSP range/CE level and/or starting symbol of a CORESET for PDCCH monitoring and/or on the number of repetitions for PRACH preamble transmission, and/or the number of repetitions for PDSCH reception providing the RAR. In one example, different window lengths are configured for different RSRP ranges/CE levels, or equivalently for different numbers of repetitions for a PRACH transmission.

For example, a larger window size can be configured for a higher CE level/lower RSRP range and/or a larger number of PRACH preamble repetitions and/or a larger number of repetitions for a PDSCH reception providing the RAR. In another example, the window size can be extended to include all repetitions of a PDSCH reception providing a RAR, for example as described in the aforementioned embodiment.

In another example, a window length can be different depending on a starting symbol of a PDCCH monitoring occasion as described in the aforementioned embodiment. For example, the window size indicates a number of slots after a last repetition for a PRACH preamble transmission, so that if PDCCH monitoring is to start after a first repetition of a PRACH preamble transmission (option (B) in the aforementioned embodiment) or after a later repetition of a PRACH preamble transmission, as defined in the specifications of the system operation or indicated by higher layers (option (C) in the aforementioned embodiment), the actual length of the PDCCH monitoring window is the indicated window size value plus the number of slots in between the starting symbol of the PDCCH monitoring occasion and the last repetition for the PRACH preamble transmission.

In one example, a window size provided by higher layers indicates the actual window size and captures the impact of a starting symbol for PDCCH monitoring (as described in the aforementioned embodiment).

In yet another example, the value provided by higher layers for the window size is the actual window size but the indicated/actual length of the window for monitoring PDCCH for scheduling a PDSCH reception providing a RAR is independent of the starting symbol of the corresponding PDCCH monitoring occasions (that is, it is independent of all options in the aforementioned embodiment), so that a sliding window for monitoring PDCCH for scheduling a PDSCH reception providing a RAR can apply.

In the examples, the size of the window is in terms of a number of slots as determined by the SCS for Type1-PDCCH CSS set as defined in NR specification.

Figure 9:
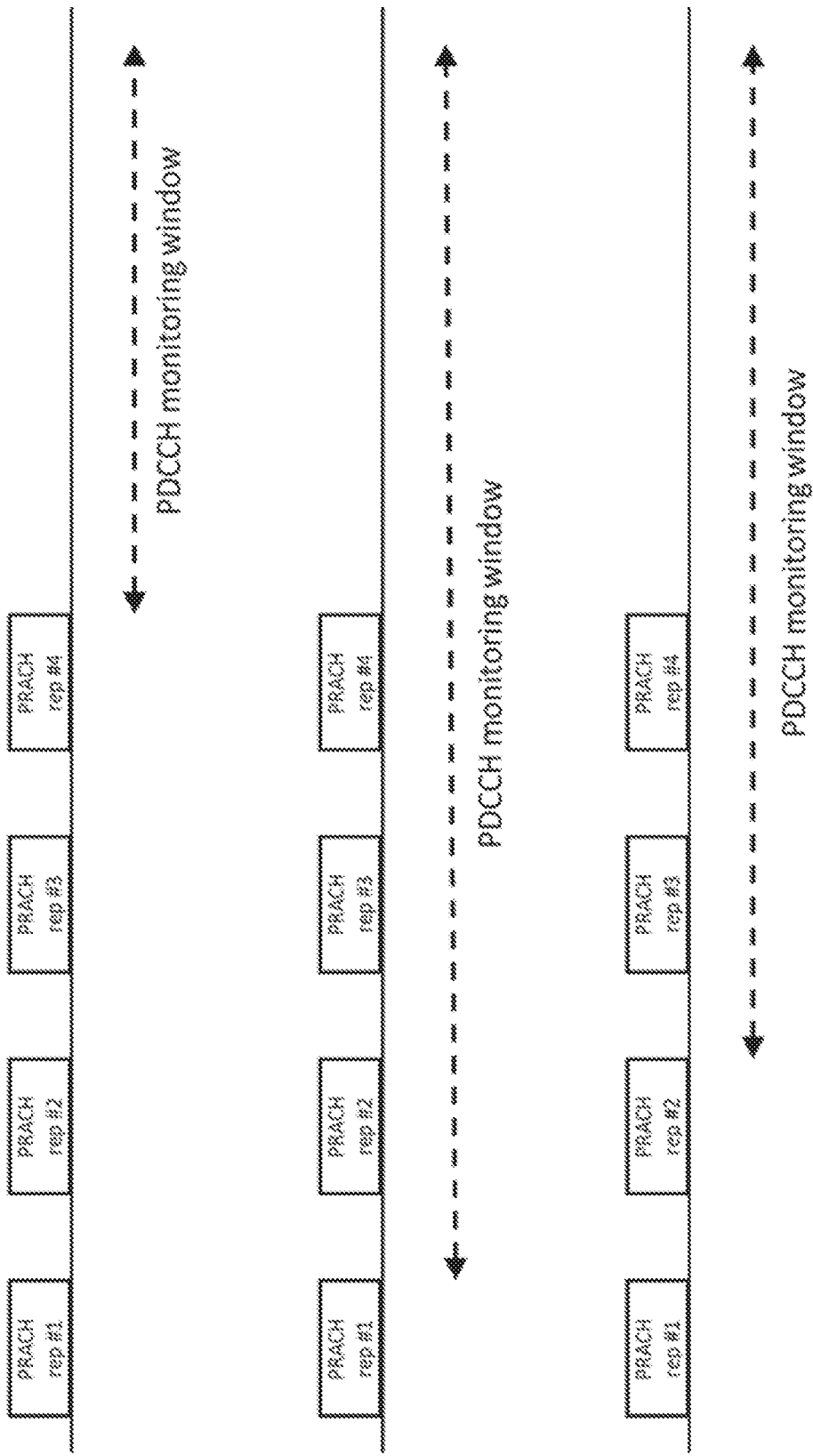
FIG. 9 illustrates an example determination of the starting symbol and length for a PDCCH monitoring window for scheduling a PDSCH reception providing a RAR for the case of PRACH preamble transmission with repetitions according to embodiments of the present disclosure.

FIG. 9 illustrates an example determination of the starting symbol and length 900 for a PDCCH monitoring window for scheduling a PDSCH reception providing a RAR for the case of PRACH preamble transmission with repetitions according to embodiments of the present disclosure. An embodiment of the determination of the starting symbol and length 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

FIG. 9 illustrates a determination of the starting symbol and length for a PDCCH monitoring window for scheduling a PDSCH reception providing a RAR for the case of PRACH preamble transmission with repetitions (4 repetitions are shown in FIG. 9).

The top figure shows an example where the PDCCH monitoring window starts after a last repetition of the PRACH preamble transmission. The middle figure shows an example where the PDCCH monitoring window starts after the first repetition of the PRACH preamble transmission. The window length is therefore extended based on the remaining number of repetitions (3 repetitions) for PRACH preamble transmission. The bottom figure shows an example where the PDCCH monitoring window starts after half of the repetitions (2 repetitions in this example figure) for the PRACH preamble transmission have been completed. The window length is therefore extended based on the remaining number of repetitions (2 repetitions in this example figure) for PRACH preamble transmission.

Figure 10:
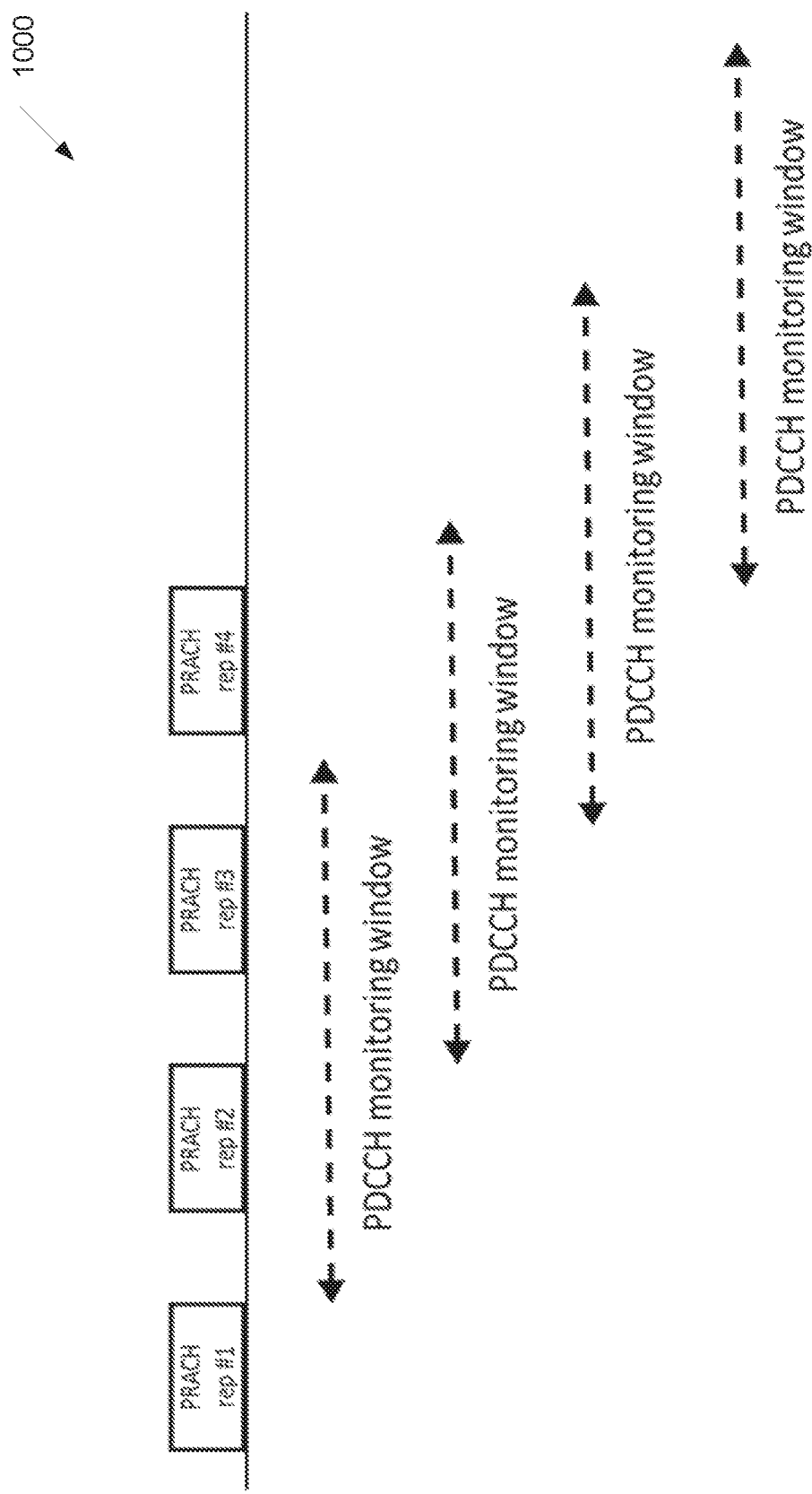
FIG. 10 illustrates another example determination of the starting symbol and length for a PDCCH monitoring window for scheduling a PDSCH reception providing a RAR for the case of PRACH preamble transmission with repetitions according to embodiments of the present disclosure.

FIG. 10 illustrates another example determination of the starting symbol and length 1000 for a PDCCH monitoring window for scheduling a PDSCH reception providing a RAR for the case of PRACH preamble transmission with repetitions according to embodiments of the present disclosure. An embodiment of the determination of the starting symbol and length 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

FIG. 10 shows another example for a determination of a starting symbol and length for a PDCCH monitoring window scheduling a PDSCH reception providing a RAR for the case of PRACH preamble repetition (4 repetitions in this example figure). In this example, the UE runs a sliding PDCCH monitoring window, where the UE considers a fixed size window of same length after each PRACH preamble transmission.

In one embodiment, after a RAR failure (due to a failure to detect a DCI format with a RA-RNTI within the RAR window or due incorrect decoding of a RAR message in a PDSCH reception, or due to absence of any RAR massage containing the preamble ID the UE used for PRACH transmission), the UE is expected to transmit a PRACH no later than $N_{T,1}+0.75$ msec after the last symbol of the window, or the last symbol of the last [repetition of] PDSCH reception, where $N_{T,1}$ is a time duration of $N_1$, symbols corresponding to a PDSCH reception time for UE processing capability 1 when additional PDSCH DM-RS is configured. For $\mu=0$, the UE assumes $N_{1,0}=14$ as shown in NR specification.

In one example, a (NR-light) UE needs to be ready to transmit the PRACH based on the timeline mentioned above, but may actually transmit the PRACH later, in a next first available cell-specific/UE-specific NR-Light-valid slot for uplink transmission In one embodiment, for the RAR UL grant included in Msg2/RAR, the content and/or fields and/or bit-width of the fields may be different from a NR UE, and/or may depend on the operating RSRP range/CE level/UE power class. An example is provided in TABLE 3.

In such embodiment, a total size (in bits) of a RAR UL grant can be same as in NR specification can have a reduced size. For example, 19 bits can be used for a RAR UL grant with reduced size while 27 bits can be used for a NR specification grant. An UL grant size, such as 19 bits or 27 bits, can depend on an operating RSRP range/CE level and/or UE power class. Zero-padding may be used whenever needed to ensure a fixed size RAR UL grant.

In one example, at least some of the methods described below for relaxed scheduling of Msg3 can apply to PUSCH/PDSCH transmissions after Msg3.

TABLE 3

RAR UL Grant Content field size for NR-Light UE

| RAR grant field | Number of bits | |
| --- | --- | --- |
| | NR-Light | NR |
| Frequency hopping flag | 0 | 1 |
| PUSCH frequency resource allocation [within the UL BWP] | 11 [or 9] | 14 |
| PUSCH time resource allocation | 4 [or 3] | 4 |
| MCS | 3 | 4 |
| TPC command for PUSCH | 3 [or 2] | 3 |
| CSI request | 1 | 1 |
| Number of Repetitions for Msg3 PUSCH | 2 | |
| UL BWP index for Msg3 PUSCH | 2 | |
| DL BWP index for Msg3/4 PDCCH | 2 | |
| Total number of bits | 27 | 27 |

In one example if frequency hopping, the frequency hopping flag is not present in the RAR UL grant.

In one example of UL BWP for Msg3, a new field is introduced in the RAR UL grant that indicates the UL BWP index for Msg3 PUSCH transmission, e.g., as shown in TABLE 4. This operation can distribute UEs across a serving cell bandwidth, thereby alleviating with congestion in an initial UL BWP when there is a large number of UEs in the serving cell. In a related example, multiple (e.g., up to four) UL BWPs are indicated by higher layers (including by a SIB) and a 2-bit field for the UL BWP index in RAR UL grant for a UE indicates an UL BWP, from the four UL BWPs, that the UE may use for Msg3 transmission.

In another example, higher layers can indicate two UL BWPs and 1 bit in the RAR UL grant indicates an UL BWP, from the two UL BWPs, for Msg3 transmission. A value of 0 can indicate the Initial UL BWP.

In yet another example, at least for a UE before receiving dedicated RRC configuration, the UE is provided by higher layers (including by a SIB) multiple (for example, a maximum of 2 or 4) Initial UL BWP configurations (common with other UEs), and a UE transmits a PUSCH Msg3 in one out of the multiple Initial UL BWPs whose index is provided in the RAR UL grant.

In one example, SIB or RRC common signaling can provide a complete configuration for a first Initial UL BWP such as a legacy/NR initial UL BWP, as well as a relative configuration for a second initial UL BWP in the same carrier/cell, for example, one or more of a relative frequency location, a relative bandwidth size, and so on.

In another example, one or multiple of the relative configuration parameters can be fixed in the system specifications.

In yet another example, the UE can be indicted by UE-specific higher layer configuration to re-use one or more of the multiple initial UL BWPs as a UE-dedicated/specific UL BWP.

According to the second example, a subcarrier spacing for Msg3 PUSCH can be different in different UL BWPs as each of the multiple UL BWPs that are indicated by higher layers for Msg3 PUSCH can have an individual subcarrier spacing configuration.

For a legacy NR UE, an active UL BWP for an Msg3 PUSCH transmission is indicated by higher layers and a corresponding subcarrier spacing is provided by the higher layer parameter subcarrierSpacing in BWP-UplinkCommon.

TABLE 4

UL BWP for Msg3 PUSCH transmission

| Value of the bit field "UL BWP index for Msg3 PUSCH" in RAR UL grant | The active UL BWP for Msg3 PUSCH transmission |
|---|---|
| 00 | UL BWP index 0 (e.g.. Initial UL BWP) |
| 01 | (Initial) UL BWP index 1 |
| 10 | (Initial) UL BWP index 2 |
| 11 | (Initial) UL BWP index 3 |

In one example of frequency resource allocation, a field for Msg3 PUSCH frequency domain resource allocation (FDRA) in RAR UL grant for a UE indicates an RB allocation within an active UL BWP for Msg3 PUSCH transmission. The bit-width of the FDRA field can be reduced compared to a NR UE, for example to 11 bits from 14 bits (as shown in NR specification).

A motivation is that an UL grant for Msg3 PUSCH transmission can be targeted for UEs supporting a reduced bandwidth compared to NR UEs.

In one example, FDRA for Msg3 PUSCH can follow UL resource allocation Type 1 in NR specification and use consecutive/contiguous (virtual) resource blocks with the exception that a "cut-off" value for a size of $N_{BWP}^{size}$ RBs for the UL BWP of the PUSCH Msg3 transmission is changed from 180 RBs (as shown in NR specification) to a smaller value such as 63 RBs, thereby requiring 11 bits for the FDRA field in the RAR UL grant.

In another example, the FDRA for Msg3 PUSCH can follow UL resource allocation Type 2 per NR specification, and use (virtual) resource block group (RBG) level allocation, different from a NR UE. According to this example, the FDRA field in the RAR UL grant indicates the RBGs that are allocated for Msg3 PUSCH transmission.

In yet another example, the RBG size can be determined based on the values for "configuration 2" for RBG-size (as shown below), regardless of the actual configuration of the layer parameter rbg-Size. Therefore, no more than 9 RBGs need to be addressed and the bit-width of the FDRA field for Msg3 PUSCH transmission is reduced to 9 bits.

TABLE 5

Nominal RBG size P

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In yet another example, the RBG size for Msg3 PUSCH can be determined based on a new configuration different from both "configuration 1" and "configuration 2" in TABLE 5 (As shown in NR specification).

In one example, a (reduced capability) UE can follow such restrictions/simplifications in FDRA for frequency resource allocation for one or both of Msg3 PUSCH and other PDSCH/PUSCH transmissions after Msg3.

In one example of time resource allocation, a limited set of time-domain resource allocation (TDRA) can be used to schedule Msg3 PUSCH transmission from a UE and the TDRA field for Msg3 PUSCH transmission is reduced in size/bits compared to NR specification.

In one example, a type-B TDRA, allowing a PUSCH transmission to not start from a beginning of a slot, may not be supported in TABLE 6A and TABLE 7A (as shown in NR specification).

In another example, some TDRA values of type-A are also not supported, such as the ones with the smallest K2 values, for example due to lower UE processing capabilities, as highlighted in TABLE 6A and TABLE 7A. To explicitly clarify the new resultant tables to be used (for NR-Light/reduced capability UE), exemplary supported entries are consolidated and captured in TABLE 6B (for normal CP) and TABLE 7B (for extended CP), respectively. According to this example, the size/bit-width of the TDRA field in RAR UL grant is 3 bits compared to 4 bits for an NR UE. TABLE 8 captures table as shown in NR specification.

In one example, a (reduced capability) UE can follow such restrictions/simplifications in TDRA for time resource allocation for one or both of Msg3 PUSCH and other PDSCH/PUSCH transmissions after Msg3.

In another example, a number of repetitions for PUSCH, including PUSCH for Msg3, is jointly coded with TDRA.

TABLE 6A

Default PUSCH time domain resource allocation A for normal CP
(The rows 1-7 and 14 are not supported for NR-Light UE.)

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 6B

New default PUSCH time domain resource allocation A
for normal CP (for NR-Light UE)
(The rows 1-7 are not supported for NR-Light UE.)

| Row index | PUSCH mapping type | $K_2$ | S | L |
|---|---|---|---|---|
| 1 | Type A | j + 1 | 0 | 14 |
| 2 | Type A | j + 1 | 0 | 12 |
| 3 | Type A | j + 1 | 0 | 10 |
| 4 | Type A | j + 2 | 0 | 14 |
| 5 | Type A | j + 2 | 0 | 12 |
| 6 | Type A | j + 2 | 0 | 10 |
| 7 | Type A | j + 3 | 0 | 14 |
| 8 | Type A | j + 3 | 0 | 10 |

TABLE 7A

Default PUSCH time domain resource allocation A for extended CP
(The rows 1-7 and 14 are not supported for NR-Light UE.)

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 7B

New default PUSCH time domain resource allocation A
for extended CP (for NR-Light UE)
(The rows 1-7 are not supported for NR-Light UE.)

| Row index | PUSCH mapping type | $K_2$ | S | L |
|---|---|---|---|---|
| 1 | Type A | j + 1 | 0 | 8 |
| 2 | Type A | j + 1 | 0 | 12 |
| 3 | Type A | j + 1 | 0 | 10 |
| 4 | Type A | j + 2 | 0 | 6 |
| 5 | Type A | j + 2 | 0 | 12 |
| 6 | Type A | j + 2 | 0 | 10 |
| 7 | Type A | j + 3 | 0 | 8 |
| 8 | Type A | j + 3 | 0 | 10 |

TABLE 8

Definition of value j

| $\mu_{PUSCH}$ | j |
|---|---|
| 0 | 1 |
| 1 | 1 |
| 2 | 2 |
| 3 | 3 |

In one example of repetition of Msg3, a new field is introduced in a RAR UL grant to indicate a number of repetitions for a Msg3 PUSCH. A mapping of the field to an actual number of repetitions for a Msg3 PUSCH transmission may depend on a configured maximum Msg3 repetition value and a certain table that depends on the RSRP range/CE level. For example, a repetition level ($N_{Msg3}$) for an initial transmission of Msg3 PUSCH is based on TABLE 9, where $Y_A$ is determined by higher layer parameter puschMsg3-maxNumRepetition if provided; otherwise, $Y_A$=8. Potential values for puschMsg3-maxNumRepetition may include {8, 16, 32}. A motivation for supporting repetitions for a Msg3 PUSCH transmission is to enhance/recover the coverage for Msg3. In one example, a similar procedure for indicating a number of PUSCH/PDSCH repetitions can be used for other PDSCH/PUSCH transmissions after Msg3.

TABLE 9

Msg3 PUSCH Repetition Level Value for NR-Light UE.

| Value of "repetition number" | Msg3 PUSCH Repetition level |
|---|---|
| "00" | $Y_A/8$ |
| "01" | $Y_A/4$ |
| "10" | $Y_A/2$ |
| "11" | $Y_A$ |

In one example of TPC command, a UE may use a limited set of TPC commands for Msg3 PUSCH transmission particularly in case of repetitions where the Msg3 PUSCH may be with maximum power and a TPC command is not practically useful. A reduced number of bits, including 0 bits, can be used to indicate the TPC command for Msg3 PUSCH, compared to 3 bits used in NR specification. Therefore, certain entries from TABLE 10 (as shown in NR specification) are not used and such exemplary entries are greyed out in the table below and also explicitly indicated separately as new TPC values and new TPC commands.

TABLE 10

TPC Command $\delta_{msg2, b, f, c}$ for Msg3 PUSCH
(The rows 0, 1, 6, and 7 are not supported.)

| TPC Command | Value (in dB) | New value (in dB) | New TPC Command |
|---|---|---|---|
| 0 | −6 | | |
| 1 | −4 | | |
| 2 | −2 | −2 | 0 |
| 3 | 0 | 0 | 1 |
| 4 | 2 | 2 | 2 |
| 5 | 4 | 4 | 3 |
| 6 | 6 | | |
| 7 | 8 | | |

In one example of MCS, a reduced set for an MCS configuration can be used. For example, 3 bits are used to indicate an MCS index, for example from the first 8 MCS indexes from a legacy/NR configuration table, compared to 4 bits in NR. A motivation is that, particularly for a Msg3 PUSCH transmission with repetitions, operating corresponding spectral efficiency can be on the lower range and modulation schemes, pi/2 BPSK or QPSK, can suffice.

In one example of DL BWP for Msg3/4 PDCCH, a new field, for example with 2 bits, is introduced to indicate a DL BWP for a UE to monitor PDCCH for possible Msg3 retransmission(s) and/or for Msg4 transmission and/or any other PDSCH/PUSCH transmission(s) after a first/initial transmission of a Msg3 (configured e.g. by temporary C-RNTI i.e. 'TC-RNTI' and/or C-RNTI and/or MCS-C-RNTI during random access procedure, or a different RNTI such as L-RNTI), for example as shown in TABLE 11.

A motivation is to distribute UEs across a serving cell bandwidth and facilitate congestion control for a potentially large number of UEs on the serving cell.

In one example, up to four DL BWPs can be indicated by higher layers and a 2-bit field for a DL BWP index in a RAR UL grant for a UE can indicate a DL BWP for an Msg3/4 PDCCH reception and/or for PDCCH reception corresponding to any other PDSCH/PUSCH transmission(s) after an initial transmission of a Msg3 by the UE.

In another example, higher layers can indicate two UL BWPs and 1 bit in the RAR UL grant indicates an UL BWP, from the two UL BWPs, for Msg3 transmission. A value of 0 can indicate the initial DL BWP/default DL BWP or a DL BWP for PDCCH for Msg3 retransmission(s) that is same as a DL BWP for a RAR PDCCH reception.

In yet another example, at least for a UE before receiving dedicated RRC configuration, the UE is provided by higher layers (including by a SIB) multiple (for example, a maximum of 2 or 4) initial DL BWP configurations (common with other UEs), and a UE performs Msg3/4 PDCCH monitoring and/or PDCCH monitoring corresponding to any other PDSCH/PUSCH transmission(s) after an initial transmission of a Msg3 in one out of the multiple initial DL BWPs whose index is provided in the RAR UL grant. For example, SIB or RRC common signaling can provide a complete configuration for a first initial DL BWP such as a legacy/NR initial DL BWP, as well as a relative configuration for a second Initial DL BWP in the same carrier/cell, for example, one or more of a relative frequency location, a relative bandwidth size, and so on.

In yet another example, one or multiple of the relative configuration parameters can be fixed in the system specifications. In a yet more example, the UE can be indicted by UE-specific higher layer configuration to re-use one or more of the multiple Initial DL BWPs as a UE-dedicated/specific DL BWP.

In one example, a UE can be provided multiple search space sets to monitor PDCCH for scheduling of Msg3 retransmission(s) and/or Msg4 reception(s) and/or any other PDSCH/PUSCH transmission(s) after an initial transmission of a Msg3. The multiple search space sets can map to respective multiple CORESETs, wherein the multiple CORESETs can have different numbers of symbols, to facilitate different coverage (enhancement) levels for PDCCH. For example, a first CORESET from the multiple CORESETs can have a duration of 1-3 symbols, while a second CORESET can have a duration of 4-6 (or 1-6, or subset thereof) OFDM symbols. For example, the set of multiple CORESETs can be same as those used for RAR PDCCH reception as in previous embodiments. In another example, the set of multiple CORESETs can have same time-domain duration(s), e.g., same number of symbols, as those for CORESETs used for RAR PDCCH reception as described in previous embodiments. In one example, the UE can determine a search space set (and a corresponding CORESET) to monitor PDCCH depending on an RSRP or a CE level. For example, the UE monitors PDCCH for scheduling of aforementioned PDSCH(s)/PUSCH(s) according to a search space set associated with a CORESET having a first number of symbols, such as 1 to 3 symbols, if an RSRSP for a DL RS (e.g., SSB or CSI-RS) is smaller than or equal to a threshold, and the UE monitors PDCCH for scheduling of aforementioned PDSCH(s)/PUSCH(s) according to a search space set associated with a CORESET having a second number of symbols, such as 1 to 6 symbols (or 4 to 6 symbols, or a subset thereof), if the RSRSP for the DL RS (e.g., SSB or CSI-RS) is larger than the threshold. Herein: the threshold can be provided by the specifications, and/or a SIB signaling such as a SIB1, and/or a common RRC signaling, and/or determined by the UE based on a predetermined or configured rule and/or formula; the configuration for the multiple search space sets, possibly other than a default search space set that is determined from a MIB and used for scheduling of the SIB, can be provided by the specifications, and/or a SIB signaling such as a SIB1, and/or a common RRC signaling, and/or determined by the UE based on a predetermined or configured rule and/or formula. In one example, a frequency resource allocation(s) for each CORESET from the set of multiple CORESETs can be same as those for CORESETs used for RAR PDCCH reception as described in previous embodiments. In another example, a frequency resource allocation(s) for each CORESET from the set of multiple CORESETs can be an offset compared to those for (a corresponding CORESET from) a set of multiple CORESETs used for RAR PDCCH reception as described in previous embodiments. According to this example, a common/same offset value or different offset value(s) can be configured for frequency-domain resource allocation(s) of each CORESET from the set of multiple CORESETs compared to (a corresponding CORESET from) a set of multiple CORESETs used for RAR PDCCH reception as described in previous embodiments. In addition, a configuration for the offset value(s) can be provided by the specifications, and/or a SIB signaling such as a SIB1, and/or a common RRC signaling, and/or determined by the UE based on a predetermined or configured rule and/or formula. In another example, the set of multiple CORESETs for monitoring/reception of PDCCH corresponding to Msg3 retransmission(s) and/or Msg4 reception(s) and/or any other PDSCH/PUSCH transmission(s) after an initial transmission of a Msg3 can be configured in one or more of the multiple (initial) DL BWPs indicated by a RAR uplink grant field as described above. For example, a first CORESET (or a first subset of CORESETs) from the set of multiple CORESETs can be configured on a first initial DL BWP, while a second CORESET (or a second subset of CORESETs) from the set of multiple CORESETs can be configured on a second initial DL BWP. The CORESETs can be associated with PDCCH monitoring through configuration of respective search space sets.

According to this example, a subcarrier spacing for Msg3/4 PDCCH reception can be different in different DL BWPs as each of the multiple DL BWPs that are indicated by higher layers for Msg3/4 PDCCH reception and/or PDCCH reception corresponding to any other PDSCH transmission(s) after an initial transmission of a Msg3 can have a separate configuration for subcarrier spacing.

In one example, the new field in RAR UL grant corresponding to DL BWP for Msg3/4 PDCCH monitoring indicates a DL BWP to receive a first slot/repetition of a PDCCH transmission for Msg3 retransmission(s) and/or Msg4 transmission and/or any other PDSCH transmission(s) after an initial transmission of a Msg3. Remaining slot(s)/repetition(s) of the PDCCH monitoring for Msg3 retransmission(s) and/or Msg4 transmission and/or any other PDSCH transmission(s) after an initial transmission of a Msg3 can be on other DL BWPs, following a frequency hopping pattern that is specified or indicated by higher layers and/or BWP switching command(s) in DCI format scheduling the Msg3 retransmission and/or Msg4 transmission and/or any other PDSCH transmission(s) after an initial transmission of a Msg3.

TABLE 11

DL BWP for Msg3/4 PDCCH reception

| Value of the bit field "DL BWP index for Msg3/4 PDCCH" in RAR UL grant | The active DL BWP for Msg3/4 PDCCH reception |
|---|---|
| "00" | DL BWP index 0 (e.g., initial/default DL BWP) |
| "01" | (Initial) DL BWP index 1 |
| "10" | (Initial) DL BWP index 2 |
| "11" | (Initial) DL BWP index 3 |

In one example of SRS request, a new field, for example with 1-3 bits, is introduced for SRS request. This can help with future beam management and scheduling. For example, such an SRS request field can be instead of or in addition to a CSI request field.

In one embodiment, with reference to slots for a PUSCH transmission scheduled by a RAR UL grant, if a UE receives a last repetition of a PDSCH with a RAR message ending in slot n for a corresponding PRACH transmission from the UE, the UE transmits a first repetition of a Msg3 PUSCH in a first valid slot, as determined by higher layer configuration, starting at or after $n+k_2+\Delta$, where $k_2$ and $\Delta$ are provided in NR specification.

In one example, if a subcarrier spacing (SCS) for RAR PDSCH reception is different from a SCS for Msg3 PUSCH transmission, the timing relationship is adjusted by a relative SCS between PDSCH and PUSCH as $$\left\lfloor n \cdot \frac{2^{\mu_{PUSCH}}}{2^{\mu_{PDSCH}}} \right\rfloor + k_2 + \Delta,$$

where $\mu_{PUSCH}$ and $\mu_{PDSCH}$ are the subcarrier spacing configurations for PUSCH and PDSCH, respectively.

In one embodiment, a UE may assume that a minimum time between a last symbol of a PDSCH reception conveying a last repetition of a RAR message with a RAR UL grant and a first symbol of a first repetition of a corresponding PUSCH transmission scheduled by a RAR UL grant is equal to $N_{T,1}+N_{T,2}+0.5$ msec, where $N_{T,1}$ is a time duration of $N_1$ symbols corresponding to a PDSCH reception time for UE processing capability 1 when additional PDSCH DM-RS is configured, $N_{T,2}$ is a time duration of $N_2$ symbols corresponding to a PUSCH preparation time for UE processing capability 1 (as shown in NR specification) and, for determining the minimum time, the UE considers that $N_1$ and $N_2$ correspond to the smaller of the SCS configurations for the PDSCH and the PUSCH. For $\mu=0$, the UE assumes $N_{1,0}=14$ (as shown in NR specification).

In another embodiment, in response to a Msg3 PUSCH transmission scheduled by a RAR UL grant when a UE has not been provided a C-RNTI, the UE attempts to detect a DCI format, such as a DCI format 1_0, with CRC scrambled by a corresponding TC-RNTI scheduling a PDSCH that includes a UE contention resolution identity (as shown in NR specification).

In response to the PDSCH reception with the UE contention resolution identity, the UE transmits HARQ-ACK information in a PUCCH. The PUCCH transmission is within a same active UL BWP as the PUSCH transmission. A minimum time between the last symbol of a last repetition of the PDSCH reception and a first symbol of the corresponding PUCCH transmission with the HARQ-ACK information is equal to $N_{T,1}+0.5$ msec. $N_{T,1}$ is a time duration of $N_1$ symbols corresponding to a PDSCH reception time for UE processing capability 1 when additional PDSCH DM-RS is configured. For $\mu=0$, the UE assumes $N_{1,0}=14$ (as shown in NR specification).

In yet another embodiment, when detecting a DCI format in response to a PUSCH transmission scheduled by a RAR UL grant, as described in NR specification, or a corresponding PUSCH retransmission scheduled by a DCI format, such as DCI format 0_0, with CRC scrambled by a TC-RNTI provided in the corresponding RAR message (as shown in NR specification), a UE may assume that the PDCCH providing the DCI format has same DM-RS antenna port quasi co-location properties, as described in NR specification as for a SS/PBCH block that the UE used for PRACH association, as described in NR specification, regardless of whether or not the UE is provided TCI-State for the CORESET where the UE receives the PDCCH with the DCI format.

In one example, the PDSCH reception with the UE contention resolution identity has same DM-RS antenna port quasi co-location properties, as described in NR specification, as for a SS/PBCH block the UE used for PRACH association, as described in NR specification.

In one example, UE distribution/congestion control during initial access for NR-Light UEs is provided in TABLE 12A and TABLE 12B.

TABLE 12A

```
-- ASN1START
-- TAG-MIB-START
MIB ::=                      SEQUENCE {
    systemFrameNumber            BIT STRING (SIZE (6)),
    subCarrierSpacingCommon      ENUMERATED {scs15or60,
scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed, notAllowed},
    spare                        BIT STRING (SIZE (1))
}
-- TAG-MIB-STOP
-- ASN1STOP
```

TABLE 12B. MIB Field Descriptions

TABLE 12B

| MIB field descriptions |
| --- |
| MIB field descriptions |
| cellBarred |
| Value barred means that the cell is barred, as defined in NR specification |
| intraFreqReselection |
| Controls cell selection/reselection to intra-frequency cells when the highest ranked cell is barred, or treated as barred by the UE, as specified in NR specification |

In one embodiment, after a UE is allowed access to a serving cell, based on the master information block (MIB) parameter cellBarred with value "notBarred," the UE checks and reinterprets the MIB parameter intraFreqReselection to determine the initial DL/UL BWP and/or CORESET #0 of the serving cell.

In one example, if the MIB parameter intraFreqReselection is set to "allowed," the UE may stay/camp on the initial DL/UL BWP and use CORESET #0 as indicated by pdcch-ConfigSIB1 as in NR. However, if the MIB parameter intraFreqReselection is set to "notAllowed," the UE determines that the UE needs to camp on another part of the system bandwidth (another DL/UL BWP other than the initial DL/UL BWP) and/or use a different CORESET #0 (e.g., CORESET #0-light) by re-interpreting the configuration in pdcch-ConfigSIB1, based on an alternative specified Table (e.g., for size and location of CORESET #0, SSB and CORESET #0-light multiplexing, and so on).

In another example, the UE access behavior is reverse of the behavior described in the previous example for the MIB parameter intraFreqReselection values "allowed" and "notAllowed." Note, NR specification has specified certain UE behaviors based upon the MIB parameter intraFreqReselection when the other MIB parameter cellBarred is set to value "barred."

However, for the case that the MIB parameter cellBarred is set to value "notBarred," no UE behaviour has been defined in NR specification based upon the MIB parameter intraFreqReselection. This is why it is possible to use this MIB parameter for further re-interpretation in the case of NR-Light/non-legacy UEs. Note that, legacy NR UEs are not expected to perform any such re-interpretation.

This solution may move all NR-Light UEs/low-capability/non-legacy UEs to a different/separate DL/UL BWP and/or CORESET #0. It is possible to combine this solution with other UE ID(s), such as a global UE ID and so on, so that only certain groups of NR-Light UEs perform this re-interpretation, while other NR-Light UEs don't perform this behaviour.

In one example, all NR-Light/non-legacy UEs perform the solution provided in this embodiment to move to different/separate DL/UL BWP and/or CORESET #0, but each group of NR-Light UEs/low-capability/non-legacy UEs may camp/stay on different DL/UL BWP and/or CORESET #0 based on other UE ID(s). Such a solution may further help with UE distribution and congestion control of NR-Light UEs across the system bandwidth during initial access.

Figure 11:
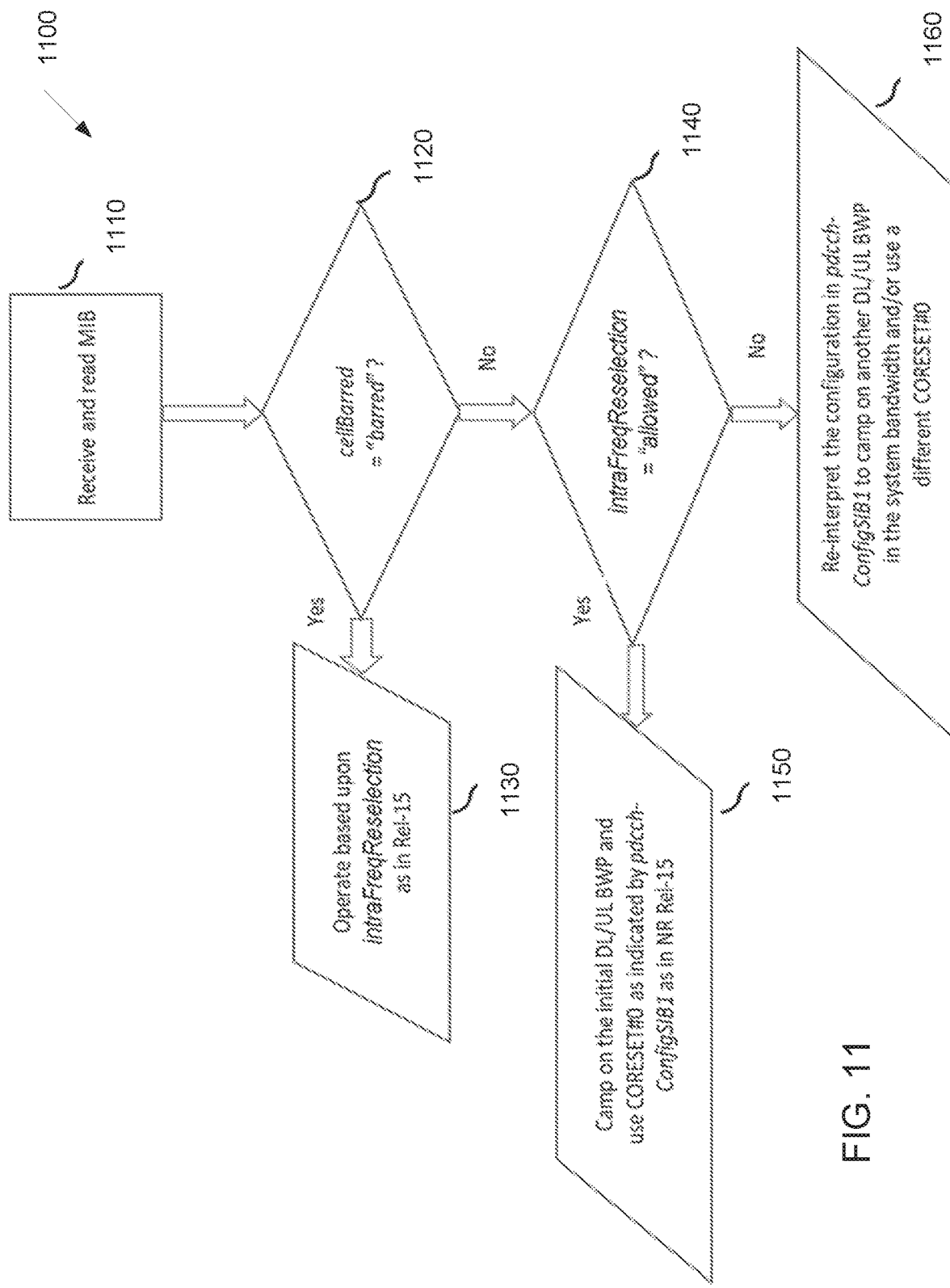
FIG. 11 illustrates an example congestion control and UE distribution during initial access for NR-Light UEs according to embodiments of the present disclosure.

FIG. 11 illustrates an example congestion control and UE distribution 1100 during initial access for NR-Light UEs according to embodiments of the present disclosure. An embodiment of the congestion control and UE distribution 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11, the UE receives and reads MIB from PBCH in step 1110. The UE determines whether the MIB parameter cellBarred has a value equal to "barred" in step 1120. If the UE determines that the MIB parameter cellBarred has a value equal to "barred," the UE operates as in NR specification based upon another MIB parameter intraFreqReselection in step 1130. However, if the UE determines that the MIB parameter cellBarred has a value equal to "notBarred," the UE considers the value of the MIB parameter intraFreqReselection in step 1140.

If the UE determines that the MIB parameter ntraFreqReselection has a value equal to "allowed," the UE camps on the initial DL/UL BW and uses CORESET #0 as indicated in pdcch-ConfigSIB1 as in NR specification in step 1150. However, if the UE determines that the MIB parameter ntraFreqReselection has a value equal to "notAllowed," the UE re-interprets pdcch-ConfigSIB1 to camp on a DL/UL BWP other than the initial DL/UL BWP and uses a different CORESET #0 (e.g., CORESET #0-Light) in step 1160.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving configurations for:
 a first control resource set (CORESET) that includes a first number of resource blocks (RBs) in a frequency domain and a first number of symbols in a time domain,
 a second CORESET that includes a second number of RBs in the frequency domain and a second number of symbols in the time domain, wherein the second number of symbols is larger than the first number of symbols, and
 a reference signal received power (RSRP) threshold;
determining a first RSRP value; and
receiving a first physical downlink control channel (PDCCH), wherein:
 the first PDCCH reception is in the first CORESET when the first RSRP value is larger than the RSRP threshold, and
 the first PDCCH reception is in the second CORESET when the first RSRP value is smaller than the RSRP threshold.

2. The method of claim 1, wherein the second number of RBs is smaller than or equal to the first number of RBs.

3. The method of claim 1, wherein:
the configuration for the first CORESET is provided by a master information block, and
the configurations for the second CORESET and for the RSRP threshold are provided by a system information block.

4. The method of claim 1, further comprising:
determining:
 a value for a difference between a reference power amplifier class and a power amplifier class of a power amplifier, and
 a second RSRP value by subtracting the value from the first RSRP value; and
transmitting a physical random access channel (PRACH) using the power amplifier:
 with a first number of repetitions when the second RSRP value is larger than the RSRP threshold, and
 with a second number of repetitions when the second RSRP value is smaller than the RSRP threshold, wherein the first number is smaller than the second number.

5. The method of claim 1, further comprising:
receiving a physical downlink shared channel (PDSCH), wherein:
 the PDSCH reception is scheduled by the first PDCCH,
 the PDSCH includes a random access response (RAR),
 the RAR includes control information scheduling a physical uplink shared channel (PUSCH) transmission, and
 the control information includes a bandwidth part (BWP) indicator field having a value; and
transmitting the PUSCH in an uplink (UL) BWP indicated by the value of the BWP indicator field from a set of UL BWPs, wherein the set of UL BWPs is provided by a system information block.

6. The method of claim 5, further comprising:
receiving a second PDCCH in a third CORESET, wherein:
 the third CORESET includes a third number of RBs in the frequency domain and a third number of symbols in the time domain, the third number of symbols is same as:
the first number of symbols if the first PDCCH is received in the first CORESET, or
the second number of symbols if the first PDCCH is received in the second CORESET,
the third CORESET is included in a downlink (DL) BWP, from a set of DL BWPs, that is linked to the UL BWP,
the set of DL BWPs is provided by the system information block, and
the second PDCCH schedules a reception of a second PDSCH; and
receiving the second PDSCH.

7. The method of claim 6, wherein:
the third number of RBs is determined based on an offset to:
the first number of RBs when the first PDCCH reception is in the first CORESET, or
the second number of RB s when the first PDCCH reception is in the second CORESET, and
the offset is provided by the system information block.

8. A user equipment (UE) comprising:
a transceiver configured to receive configurations for:
a first control resource set (CORESET) that includes a first number of resource blocks (RBs) in a frequency domain and a first number of symbols in a time domain,
a second CORESET that includes a second number of RBs in the frequency domain and a second number of symbols in the time domain, wherein the second number of symbols is larger than the first number of symbols, and
a reference signal received power (RSRP) threshold; and
a processor configured to determine a first RSRP value, wherein:
the transceiver is further configured to receive a first physical downlink control channel (PDCCH),
the first PDCCH reception is in the first CORESET when the first RSRP value is larger than the RSRP threshold, and
the first PDCCH reception is in the second CORESET when the first RSRP value is smaller than the RSRP threshold.

9. The UE of claim 8, wherein the second number of RBs is smaller than or equal to the first number of RBs.

10. The UE of claim 8, wherein:
the configuration for the first CORESET is provided by a master information block, and
the configurations for the second CORESET and for the RSRP threshold are provided by a system information block.

11. The UE of claim 8, wherein:
the processor is further configured to determine:
a value for a difference between a reference power amplifier class and a power amplifier class of a power amplifier, and
a second RSRP value by subtracting the value from the first RSRP value;
the transceiver is further configured to transmit a physical random access channel (PRACH) using the power amplifier:
with a first number of repetitions when the second RSRP value is larger than the RSRP threshold, and
with a second number of repetitions when the second RSRP value is smaller than the RSRP threshold; and
the first number is smaller than the second number.

12. The UE of claim 8, wherein the transceiver is further configured to:
receive a physical downlink shared channel (PDSCH), wherein:
the PDSCH reception is scheduled by the first PDCCH,
the PDSCH includes a random access response (RAR),
the RAR includes control information scheduling a physical uplink shared channel (PUSCH) transmission, and
the control information includes a bandwidth part (BWP) indicator field having a value; and
transmit the PUSCH in an uplink (UL) BWP indicated by the value of the BWP indicator field from a set of UL BWPs, wherein the set of UL BWPs is provided by a system information block.

13. The UE of claim 12, wherein the transceiver is further configured to receive a second PDCCH in a third CORESET, wherein:
the third CORESET includes a third number of RBs in the frequency domain and a third number of symbols in the time domain,
the third number of symbols is same as:
the first number of symbols if the UE receives the first PDCCH in the first CORESET, or
the second number of symbols if the UE receives the first PDCCH in the second CORESET,
the third CORESET is included in a downlink (DL) BWP, from a set of DL BWPs, that is linked to the UL BWP wherein the set of DL BWPs is provided by the system information block, and
the second PDCCH schedules a reception of a second PDSCH; and
receive the second PDSCH.

14. The UE of claim 13, wherein:
the third number of RBs is determined based on an offset to:
the first number of RBs when the first PDCCH reception is in the first CORESET, or
the second number of RB s when the first PDCCH reception is in the second CORESET, and
the offset is provided by the system information block.

15. A base station comprising:
a processor; and
a transceiver operably connected to the processor, the transceiver configured to:
transmit configurations for:
a first control resource set (CORESET) that includes a first number of resource blocks (RBs) in a frequency domain and a first number of symbols in a time domain,
a second CORESET that includes a second number of RBs in the frequency domain and a second number of symbols in the time domain, wherein the second number of symbols is larger than the first number of symbols, and
a reference signal received power (RSRP) threshold; and
transmit a first physical downlink control channel (PDCCH), wherein the first PDCCH transmission:
is in the first CORESET or in the second CORESETs, and
schedules a transmission of a physical downlink shared channel (PDSCH) that includes a random access response (RAR) message,
wherein the configuration for the first CORESET is provided by a master information block, and wherein the configurations for the second CORESET and for the RSRP threshold are provided by a system information block.

16. The base station of claim 15, wherein the second number of RBs is smaller than or equal to the first number of RBs.

17. The base station of claim 15, wherein:
the RAR includes control information scheduling a physical uplink shared channel (PUSCH) transmission,
the control information includes a bandwidth part (BWP) indicator field having a value,
the transceiver is further configured to receive the PUSCH in an uplink (UL) BWP indicated by the value of the BWP indicator field from a set of UL BWPs, and
the set of UL BWPs is provided by a system information block.

18. The base station of claim 17, wherein the transceiver is further configured to:
transmit a second PDCCH in a third CORESET, wherein:
the third CORESET includes a third number of RBs in the frequency domain and a third number of symbols in a time domain,
the third number of symbols is same as:
the first number of symbols when the first PDCCH transmission is in the first CORESET, or
the second number of symbols when the first PDCCH transmission is in the second CORESET,
the third CORESET is included in a downlink (DL) BWP, from a set of DL BWPs, that is linked to the UL BWP,
the set of DL BWPs is provided by the system information block, and
the second PDCCH schedules a reception of a second PDSCH; and
transmit the second PDSCH.

19. The base station of claim 18, wherein:
the third number of RBs is indicated based on an offset to:
the first number of RBs when the first PDCCH transmission is in the first CORESET, or
the second number of RBs when the first PDCCH transmission is in the second CORESET, and
the offset is provided by the system information block.

* * * * *